(12) United States Patent
Garcia et al.

(10) Patent No.: US 11,719,193 B2
(45) Date of Patent: Aug. 8, 2023

(54) HYBRID METAL COMPOSITE STRUCTURES, ROCKET MOTORS INCLUDING HYBRID METAL COMPOSITE STRUCTURES, AND RELATED METHODS

(71) Applicant: Northrop Grumman Systems Corporation, Falls Church, VA (US)

(72) Inventors: Benjamin W. C. Garcia, Tremonton, UT (US); Brian Christensen, Willard, UT (US); David R. Nelson, Logan, UT (US); Braden Day, Nibley, UT (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 17/330,040

(22) Filed: May 25, 2021

(65) Prior Publication Data

US 2021/0340933 A1 Nov. 4, 2021

Related U.S. Application Data

(63) Continuation of application No. 15/391,016, filed on Dec. 27, 2016, now abandoned.

(51) Int. Cl.
*F02K 9/34* (2006.01)
*B64G 1/40* (2006.01)
(Continued)

(52) U.S. Cl.
CPC .................. *F02K 9/34* (2013.01); *B32B 3/26* (2013.01); *B32B 3/263* (2013.01); *B32B 3/266* (2013.01);
(Continued)

(58) Field of Classification Search
CPC .......... B32B 15/04; B32B 15/14; B32B 3/26; B32B 3/263; B32B 3/266; B32B 3/28;
(Continued)

(56) References Cited

U.S. PATENT DOCUMENTS 4,992,323 A * 2/1991 Vogelesang ............. B32B 15/18
428/419
5,348,603 A 9/1994 Yorgason
(Continued)

OTHER PUBLICATIONS

Panagis Foteinopoulos, Unified approach in design and manufacturing optimization of hybrid metal-composites parts, 2016, Elsevier (Year: 2016).
(Continued)

*Primary Examiner* — Todd E Manahan
*Assistant Examiner* — Kyle Robert Thomas
(74) *Attorney, Agent, or Firm* — TraskBritt

(57) ABSTRACT

A hybrid metal composite (HMC) structure comprises a first tier comprising a first fiber composite material structure, a second tier longitudinally adjacent the first tier and comprising a first metallic structure and a second fiber composite material structure laterally adjacent the first metallic structure, a third tier longitudinally adjacent the second tier and comprising a third fiber composite material structure, and a fourth tier longitudinally adjacent the third tier and comprising a second metallic structure and a fourth fiber composite material structure laterally adjacent the second metallic structure. At least one lateral end of the second metallic structure is laterally offset from at least one lateral end of the first metallic structure most proximate thereto. Methods of forming an HMC structure, and related rocket motors and multi-stage rocket motor assemblies are also disclosed.

21 Claims, 11 Drawing Sheets

(51) Int. Cl.

| | |
|---|---|
| *F02K 9/97* | (2006.01) |
| *B32B 3/26* | (2006.01) |
| *B32B 3/28* | (2006.01) |
| *B32B 3/30* | (2006.01) |
| *B32B 5/02* | (2006.01) |
| *B32B 7/04* | (2019.01) |
| *B32B 5/04* | (2006.01) |
| *B32B 5/12* | (2006.01) |
| *B32B 5/06* | (2006.01) |
| *B32B 5/10* | (2006.01) |
| *B32B 15/14* | (2006.01) |
| *B32B 15/04* | (2006.01) |

(52) U.S. Cl.
CPC ............... *B32B 3/28* (2013.01); *B32B 3/30* (2013.01); *B32B 5/02* (2013.01); *B32B 5/022* (2013.01); *B32B 5/024* (2013.01); *B32B 5/026* (2013.01); *B32B 5/028* (2013.01); *B32B 5/04* (2013.01); *B32B 5/06* (2013.01); *B32B 5/10* (2013.01); *B32B 5/12* (2013.01); *B32B 7/04* (2013.01); *B32B 15/04* (2013.01); *B32B 15/14* (2013.01); *B64G 1/403* (2013.01); *F02K 9/97* (2013.01); *F05D 2300/6032* (2013.01)

(58) Field of Classification Search
CPC .. B32B 3/30; B32B 7/04; B32B 7/045; B32B 7/08; B32B 5/02; B32B 5/022; B32B 5/024; B32B 5/026; B32B 5/028; B32B 5/04; B32B 5/06; B32B 5/08; B32B 5/10; B32B 5/12; F02K 9/60; F02K 9/76; F02K 9/763; B29C 70/885
See application file for complete search history.

(56) References Cited

U.S. PATENT DOCUMENTS

| | | | |
|---|---|---|---|
| 7,115,323 B2 * | 10/2006 | Westre | B32B 15/08 428/189 |
| 8,715,439 B2 * | 5/2014 | Chakrabarti | C04B 37/025 428/545 |
| 8,993,084 B2 | 3/2015 | Griess et al. | |
| 9,090,043 B2 | 7/2015 | Matsen et al. | |
| 9,102,571 B2 | 8/2015 | Szweda et al. | |
| 9,962,909 B2 * | 5/2018 | Mizrahi | B32B 15/08 |
| 10,112,373 B2 * | 10/2018 | Griess | B29C 70/86 |
| 2005/0048260 A1 * | 3/2005 | Modin | B32B 38/08 428/138 |
| 2005/0271859 A1 | 12/2005 | Tuss et al. | |
| 2007/0154680 A1 * | 7/2007 | Escobar Benavides | B32B 15/043 428/57 |
| 2010/0078259 A1 * | 4/2010 | Stevenson | B29C 66/72141 156/92 |
| 2012/0045606 A1 | 2/2012 | Griess et al. | |
| 2012/0214018 A1 * | 8/2012 | Mizrahi | B32B 15/14 428/600 |
| 2015/0024160 A1 * | 1/2015 | Georgeson | B29C 66/7394 156/60 |
| 2015/0159587 A1 * | 6/2015 | Facciano | B64G 1/64 60/250 |

OTHER PUBLICATIONS

Thakre et al., "Solid Propellants" Encyclopedia of Aerospace Engineering, 2010 John Wiley & Sons, Ltd. ISBN: 978-0-470-68665-2; 10 pages.

Ucsnik et al. "Experimental investigation of a novel hybrid metal composite joining technology" Article, Composites: Part A 41 (2010) pp. 369-374; Contents lists available at ScienceDirect, Composites: Part A journal homepage: www.elsevier.com/locate/compositesa.

* cited by examiner

HYBRID METAL COMPOSITE STRUCTURES, ROCKET MOTORS INCLUDING HYBRID METAL COMPOSITE STRUCTURES, AND RELATED METHODS

CROSS-REFERENCE TO RELATED APPLICATION

This application is a continuation of U.S. patent application Ser. No. 15/391,016, filed Dec. 27, 2016, the disclosure of which is hereby incorporated herein in its entirety by this reference.

STATEMENT REGARDING FEDERALLY SPONSORED RESEARCH OR DEVELOPMENT

This invention was made with government support under Contract Number FA8814-16-C-0010 awarded by the United States Department of the Air Force. The government has certain rights in the invention.

TECHNICAL FIELD

Embodiments disclosed herein relate to hybrid metal composite (HMC) structures, to structures and apparatuses including HMC structures, and to methods of forming an HMC structure. More particularly, embodiments disclosed herein relate to HMC structures including longitudinally neighboring metallic structures having offset lateral ends relative to one another, to structures and apparatuses including HMC structures, and to methods of forming an HMC structure.

BACKGROUND

Fiber composite materials include reinforcing fibers embedded in a matrix material. One example of a fiber composite material is a carbon fiber composite (CFC) material, which includes carbon fibers embedded in a matrix material. CFC materials exhibit a variety of desirable properties, such as high temperature stability, high thermal resistance, high structural integrity, light weight, corrosion resistance, and desirable electrical and magnetic properties. CFC materials may, for example, exhibit enhanced strength at a given weight than metal materials. Thus, CFC materials are of interest for use in a wide variety of applications, such as various aerospace, marine, and automotive applications requiring structures having one or more of the aforementioned properties.

Structures formed of composite materials have been coupled together to form components of rocket motors, such as rocket motor casings. However, fiber composite materials may exhibit an increased stress concentration at locations proximate the fasteners (e.g., bolts, rods, pins, etc.) used to couple the fiber composite material structures together. Accordingly, the resulting assembly may exhibit a low bearing strength at locations proximate the fasteners. To overcome such problems, it is known to manufacture fiber composite material structures to have an increased thickness at locations where the fiber composite material structure will be coupled to another material structure (e.g., another fiber composite material structure). In some instances, the fiber composite materials of such structures may be two to three times thicker proximate the fastener regions than in other regions thereof. Unfortunately, increasing the thickness of the fiber composite materials proximate the fastener regions undesirably increases an overall weight of a fiber composite material assembly formed of and including the fiber composite material structures.

Methods of improving the bearing strength of a fiber composite material structure without increasing the thickness thereof include providing thin metallic structures between portions (e.g., tiers, layers) of the fiber composite material to form an HMC structure. The inclusion of the metallic structures may reduce an overall weight of the HMC structure as compared to fiber composite material structures without the metallic structures. However, the metallic structures can create other problems, such as the formation of stress concentration points along lateral ends of the metallic structures within the HMC structure. Alignment of the lateral ends of the metallic structures results in the alignment of such stress concentration points, which can negatively impact the strength and structural integrity of the HMC structure while under load.

It would, therefore, be desirable to have new HMC structures and related methods that alleviate one or more of the above problems. It would also be desirable to have new multi-component structural assemblies, rocket motors, and rocket motor assemblies (e.g., multi-stage rocket motor assemblies) including such HMC structures.

BRIEF SUMMARY

Embodiments described herein include HMC structures, structures and apparatuses including HMC structures, and methods of forming an HMC structure. In accordance with one embodiment described herein, an HMC structure comprises a first tier comprising a first fiber composite material structure, a second tier longitudinally adjacent the first tier and comprising a first metallic structure and a second fiber composite material structure laterally adjacent the first metallic structure, a third tier longitudinally adjacent the second tier and comprising a third fiber composite material structure, and a fourth tier longitudinally adjacent the third tier and comprising a second metallic structure and a fourth fiber composite material structure laterally adjacent the second metallic structure. At least one lateral end of the second metallic structure is laterally offset from at least one lateral end of the first metallic structure most proximate thereto.

In additional embodiments, a method of forming an HMC structure comprises forming a first tier comprising a first fiber composite material structure over a substrate. A second tier comprising a first metallic structure and a second fiber composite material structure is formed over the first tier. A third tier comprising a third fiber composite material structure is formed over the second tier. A fourth tier comprising a second metallic structure and a fourth fiber composite material structure is formed over the third tier, at least one lateral end of the second metallic structure laterally offset from at least one lateral end of the first metallic structure most proximate thereto. A fifth tier comprising a fifth fiber composite material structure is formed over the fourth tier. At least the first tier, the second tier, the third tier, the fourth tier, and the fifth tier are subjected to at least one curing process.

In yet additional embodiments, a rocket motor comprises a casing comprising an HMC structure, a propellant structure within the casing, and a nozzle assembly connected to an aft end of the casing. The HMC structure comprises primary tiers comprising fiber composite material structures, and secondary tiers longitudinally adjacent one or more of the primary tiers and comprising metallic structures and additional fiber composite material structures laterally adjacent the metallic structures. One or more lateral ends of at least one of the metallic structures are laterally offset from one or more corresponding lateral ends of at least one other of the metallic structures longitudinally neighboring the at least one of the metallic structures.

In further embodiments, a multi-stage rocket motor assembly comprises an outer housing and stages provided in an end-to-end relationship with one another within the outer housing. The outer housing comprises at least one HMC structure comprising tiers comprising fiber composite material structures, and additional tiers longitudinally adjacent one or more of the tiers and comprising metallic structures and additional fiber composite material structures laterally adjacent the metallic structures. One or more lateral ends of at least one of the metallic structures are laterally offset from one or more corresponding lateral ends of at least one other of the metallic structures longitudinally neighboring the at least one of the metallic structures. Each of the stages comprises a casing, a propellant structure within the casing, and a nozzle assembly connected to an aft end of the casing.

DETAILED DESCRIPTION

Figure 1:
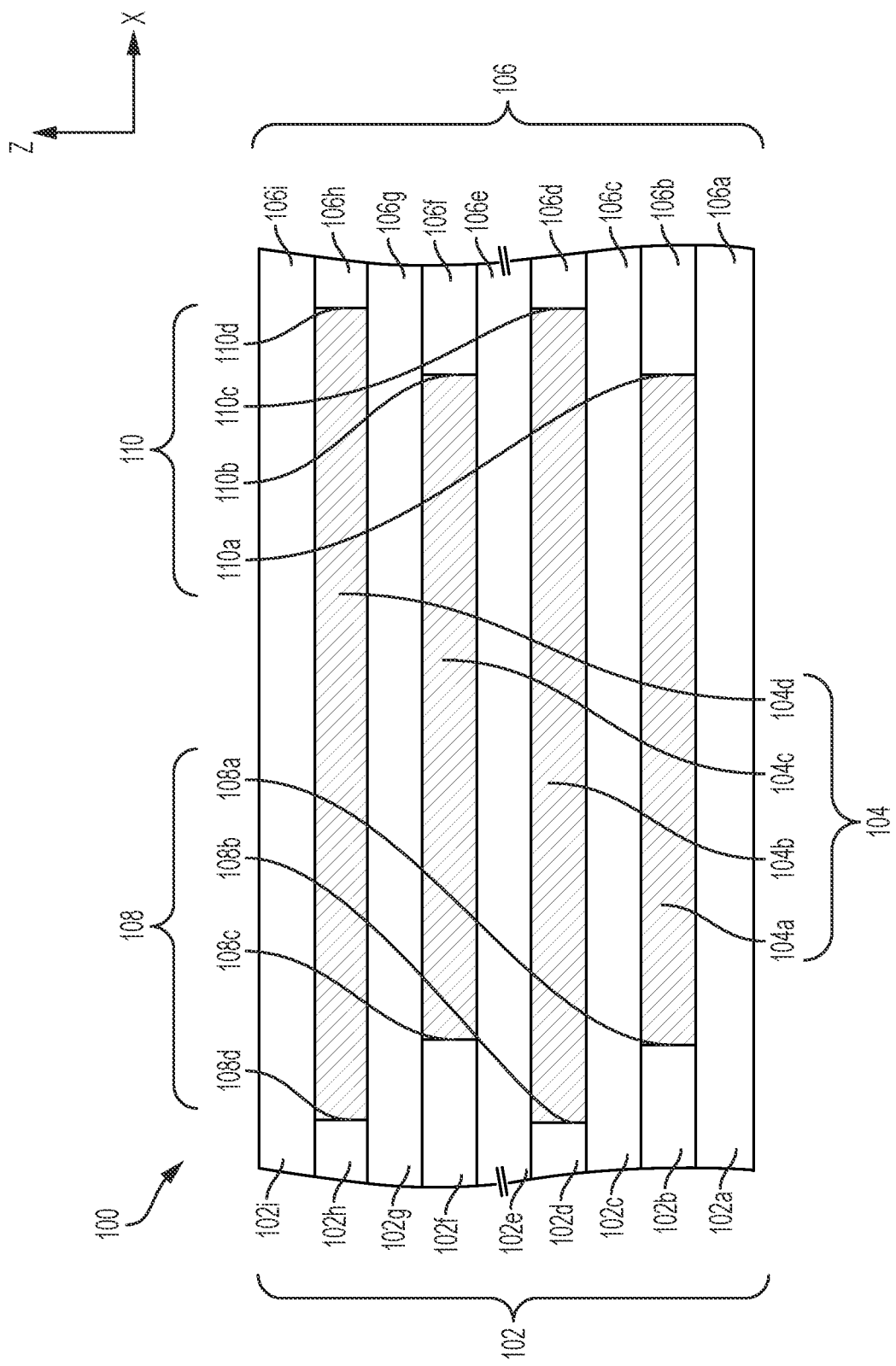
FIGS. 1 through 7 are cross-sectional views of HMC structures, in accordance with embodiments of the disclosure.

HMC structures are described, as are structures and apparatuses (e.g., rocket motors, multi-stage rocket motor assemblies, etc.) including HMC structures, and methods of forming HMC structures. For example, in accordance with an embodiment of the disclosure, an HMC structure includes one or more primary tiers, each tier including at least one fiber composite material structure (e.g., carbon fiber composite material structure, etc.), and two or more secondary tiers, each secondary tier including at least one metallic structure (e.g., metal structure, metal alloy structure, etc.) and at least one fiber composite material structure laterally adjacent the metallic structure. Metallic structures of at least some longitudinally neighboring secondary tiers may exhibit lateral ends that are laterally offset (e.g., unaligned) with one another. Each lateral end (e.g., a first lateral end, and a second lateral end) of a metallic structure in a given secondary tier may be laterally offset from each corresponding lateral end (e.g., a correspond first lateral end, and a corresponding second lateral end) of an additional metallic structure in a longitudinally neighboring secondary tier; or a first lateral end of the metallic structure in the given secondary tier may be laterally offset from a corresponding first lateral end of the additional metallic structure in the longitudinally neighboring secondary tier, and a second lateral end of the metallic structure in the given secondary tier may be laterally aligned with a corresponding second lateral end of the additional metallic structure in the longitudinally neighboring secondary tier. In addition, each of the metallic structures may exhibit substantially the same width, or at least one of the metallic structures may exhibit a different width than at least one other of the metallic structures. Furthermore, lateral centers of the metallic structures of different secondary tiers may all be substantially aligned with one another, or a lateral center of a metallic structure of at least one of the secondary tiers may be laterally offset from a lateral center of a metallic structure of at least one other of the secondary tiers. The metallic structures may be provided in the HMC structure proximate locations of the HMC structure that will be coupled to one or more other structures (e.g., one or more other HMC structures) to form an assembly. The HMC structures of the disclosure may exhibit an improved strength and structural integrity as compared to conventional HMC structures not including the metallic structures and metallic structure arrangements of the disclosure.

The following description provides specific details, such as sizes, shapes, material compositions, and orientations in order to provide a thorough description of embodiments of the disclosure. However, a person of ordinary skill in the art would understand that the embodiments of the disclosure may be practiced without necessarily employing these specific details. Embodiments of the disclosure may be practiced in conjunction with conventional fabrication techniques employed in the industry. In addition, the description provided below does not form a complete process flow for manufacturing an HMC structure, structure including an HMC structure, or apparatus (e.g., rocket motor, rocket motor assembly, etc.) including an HMC structure. Only those process acts and structures necessary to understand the embodiments of the disclosure are described in detail below. Additional acts to form a complete HMC structure, a complete structure including an HMC structure, or a complete apparatus (e.g., a complete rocket motor, a complete rocket motor assembly, etc.) including an HMC structure from the structures described herein may be performed by conventional fabrication processes.

Drawings presented herein are for illustrative purposes only, and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles between surfaces that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the terms "longitudinal," "vertical," "lateral," and "horizontal" are in reference to a major plane of a substrate (e.g., base material, base structure, base construction, etc.) in or on which one or more structures and/or features are formed and are not necessarily defined by earth's gravitational field. A "lateral" or "horizontal" direction is a direction that is substantially parallel to the major plane of the substrate, while a "longitudinal" or "vertical" direction is a direction that is substantially perpendicular to the major plane of the substrate. The major plane of the substrate is defined by a surface of the substrate having a relatively large area compared to other surfaces of the substrate.

As used herein, spatially relative terms, such as "beneath," "below," "lower," "bottom," "above," "over," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "over" or "above" or "on" or "on top of" other elements or features would then be oriented "below" or "beneath" or "under" or "on bottom of" the other elements or features. Thus, the term "over" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, the terms "configured" and "configuration" refer to a size, shape, material composition, orientation, and arrangement of one or more of at least one structure and at least one apparatus facilitating operation of one or more of the structure and the apparatus in a predetermined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

FIG. 1 is a simplified cross-sectional view of an HMC structure 100, in accordance with an embodiment of the disclosure. The HMC structure 100 includes one or more fiber composite material structures 102 and two or more metallic structures 104 (e.g., metallic plies, metallic sheets, etc.) arranged in tiers 106 (e.g., layers). For clarity and ease of understanding of the drawings and related description, FIG. 1 shows the HMC structure 100 as including nine (9) tiers 106 (i.e., tiers 106a through 106i) of the fiber composite material structures 102 and the metallic structures 104. However, the HMC structure 100 may include a different number of tiers 106. For example, in additional embodiments, the HMC structure 100 may include greater than nine (9) tiers 106 (e.g., greater than or equal to eleven (11) tiers 106, greater than or equal to fifteen (15) tiers 106, greater than or equal to twenty-five (25) tiers 106, or greater than or equal to fifty (50) tiers 106) of the fiber composite material structures 102 and the metallic structures 104, or may include less than nine (9) tiers 106 (e.g., less than or equal to seven (7) tiers, less than or equal to five (5) tiers 106, or less than or equal to three (3) tiers 106) of the fiber composite material structures 102 and the metallic structures 104. In addition, while FIG. 1 depicts a particular configuration of the HMC structure 100, one of ordinary skill in the art will appreciate that the HMC structure 100 may exhibit a different configuration, such as a configuration exhibiting one or more of a different size, a different shape, different features, different feature spacing, different components, and a different arrangement of components. FIG. 1 illustrates just one non-limiting example of the HMC structure 100.

Each of the tiers 106 may include at least one of the fiber composite material structures 102, and two or more of the tiers 106 may each individually also include at least one of the metallic structures 104. The HMC structure 100 may, for example, include an alternating sequence of tiers 106 including at least one of the fiber composite material structures 102 but not including (e.g., free of) at least one of the metallic structures 104, and other tiers 106 including at least one of the fiber composite material structures 102 and at least one of the metallic structures 104. By way of non-limiting example, as shown in FIG. 1, the HMC structure 100 may include a first tier 106a including a first fiber composite material structure 102a; a second tier 106b over the first tier 106a and including a second fiber composite material structure 102b and a first metallic structure 104a laterally adjacent the second fiber composite material structure 102b; a third tier 106c over the second tier 106b and including a third fiber composite material structure 102c; a fourth tier 106d over the third tier 106c and including a fourth fiber composite material structure 102d and a second metallic structure 104b laterally adjacent the fourth fiber composite material structure 102d; a fifth tier 106e over the fourth tier 106d and including a fifth fiber composite material structure 102e; a sixth tier 106f over the fifth tier 106e and including a sixth fiber composite material structure 102f and a third metallic structure 104c laterally adjacent the sixth fiber composite material structure 102f, a seventh tier 106g over the sixth tier 106f and including a seventh fiber composite material structure 102g; an eighth tier 106h over the seventh tier 106g and including an eighth fiber composite material structure 102h and a fourth metallic structure 104d laterally adjacent the eighth fiber composite material structure 102h; and a ninth tier 106i over the eighth tier 106h and including a ninth fiber composite material structure 102i. Accordingly, in some embodiments, every other tier 106 of the HMC structure 100 includes at least one of the metallic structures 104. In additional embodiments, the HMC structure 100 may exhibit a different arrangement of the fiber composite material structures 102 and the metallic structures 104 than that depicted in FIG. 1. By way of non-limiting example, in additional embodiments, the HMC structure 100 includes multiple (e.g., more than one) tiers 106 free of (e.g., absent) metallic structures 104 intervening between at least two (2) (e.g., a pair) of the tiers 106 each individually including at least one of the metallic structures 104.

With continued reference to FIG. 1, each of the fiber composite material structures 102 may be formed of and include fibers and matrix material. The fibers may be at least partially (e.g., substantially) surrounded (e.g., enveloped) by the matrix material. By way of non-limiting example, each of the fiber composite material structures 102 may comprise a fiber preform infiltrated (e.g., impregnated) with matrix material. As used herein, the term "fiber preform" means and includes a structure formed of and including fibers. The fiber preform may comprise a single tow of fibers (e.g., a substantially unidirectional bundle of fibers), a tape of multiple tows of the fibers stitched together using another material, such as a glass material, or a woven fabric of multiple tows of the fiber (e.g., a plain weave of the multiple tows, a 4-harness satin weave of the multiple tows, a 5-harness satin weave of multiple tows, an 8-harness satin weave of the multiple tows, etc.). In some embodiments, at least some of the fibers are provided as a 12 k fiber tow (i.e., a bundle of about 12,000 fibers).

The fibers of the fiber composite material structures 102 may be formed of and include any material(s) compatible with the other components (e.g., the matrix material of the fiber composite material structures 102, the metallic structures 104, etc.) of the HMC structure 100. As used herein, the term "compatible" means and includes a material that does not react with, break down, or absorb another material in an unintended way, and that also does not impair the chemical and/or mechanical properties of the another material in an unintended way. By way of non-limiting example, the fibers of the fiber composite material structures 102 may be formed of and include one or more of carbon fibers, ceramic fibers (e.g., oxide-based ceramic fibers, such as one or more of alumina fibers, alumina-silica fibers, and alumina-boria-silica fibers; non-oxide-based ceramic fibers, such as one or more of silicon carbide (SiC) fibers, silicon nitride (SiN) fibers, fibers including SiC on a carbon core, SiC fibers containing titanium, silicon oxycarbide fibers, silicon oxycarbonitride fibers; etc.), polymeric fibers (e.g., thermoplastic fibers, such as one or more of polyethylene (PE) fibers, polypropylene (PP) fibers, polystyrene (PS) fibers, polyvinyl chloride (PVC) fibers, poly(methyl methacrylate) (PMMA) fibers, polycarbonate (PC) fibers, polyphenylene oxide (PPO) fibers, polyetherketone (PEK) fibers, polyetheretherketone (PEEK) fibers, polyaryletherketone (PAEK) fibers, polyetherketoneetherketoneketone (PEKEKK) fibers, polyetherketoneketone (PEKK) fibers, polyether sulfone (PES) fibers, polyphenylene sulfide (PPS) fibers, polyphenylsulfone (PPSU) fibers, self-reinforced polyphenylene (SRP) fibers, aromatic polyamide (PA) fibers, and polyamideimide (PAI) fibers; thermoset plastic fibers, such as one or more of polyimide (PI) fibers, polyurethane (PU) fibers, phenol-formaldehyde fibers, urea-formaldehyde fibers, polyester fibers; etc.), glass fibers, boron fibers, and other fibers. A material composition of the fibers of each of the fiber composite material structures 102 may be selected relative to a material composition of the matrix material of each of the fiber composite material structures 102, as described in further detail below. In some embodiments, the fibers of one or more of the fiber composite material structures 102 comprise carbon fibers. The fibers may constitute from about 10 volume percent (vol %) to about 90 vol % (e.g., from about 25 vol % to about 75 vol %, from about 40 vol % to about 60 vol %, etc.) of the fiber composite material structures 102.

The fibers of the fiber composite material structures 102 may have any desired dimensions (e.g., lengths, widths, thicknesses) compatible with a desired end use of the HMC structure 100. In some embodiments, the fibers comprise intermediate modulus fibers (e.g., intermediate modulus carbon fibers) having a tensile moduli within a range of from about 200 Gigapascals (GPa) to about 350 GPa (e.g., within a range of from about 275 GPa to about 350 GPa). In some embodiments, the fibers exhibit a tensile modulus of about 350 GPa. In additional embodiments, the fibers exhibit a tensile modulus of about 275 GPa. Each of the fibers may have a diameter within a range of from about 1 μm to about 100 μm (e.g., from about 1 μm to about 5 μm, from about 5 μm to about 10 μm, from about 10 μm to about 50 μm, from about 50 μm to about 100 μm, etc.). In some embodiments, at least some of the fibers are provided as an intermediate modulus 12 k fiber tow (e.g., intermediate modulus 12 k carbon fiber tow). Suitable intermediate modulus 12 k fiber tows are commercially available from numerous sources, such as from Hexcel Corporation of Stamford, Conn. under the HEXTOW® trade name (e.g., HEXTOW® IM7 Carbon Fiber).

The matrix material of the fiber composite material structures 102 may be formed of and include any material(s) compatible with the other components (e.g., the fibers of the fiber composite material structures 102, the metallic structures 104, etc.) of the HMC structure 100. The matrix material of each of the fiber composite material structures 102 may be selected relative to the fibers of each of the fiber composite material structures 102 to impart the fiber composite material structures 102 with desirable mechanical properties. By way of non-limiting example, the matrix material of the fiber composite material structures 102 may be formed of and include one or more of a ceramic material (e.g., an oxide ceramic material, such as one or more of an alumina material, an alumina-silica material, an alumina-boria-silica material, a zirconia material, etc.; a non-oxide ceramic material, such as one or more of an SiC material, an SiN material, a silicon hexaboride material, an aluminum nitride material, a boron nitride material, a boron carbide material, a titanium boride material, a titanium carbide material, and a hafnium carbide material), a polymeric material (e.g., an epoxy material; a thermoplastic polymer material, such as one or more of a PE material, a PP material, a PS material, a PVC material, a PMMA material, a PC material, a PPO material, a PEK material, a PEEK material, a PAEK material, a PEKK material, a PEKEKK material, a PES material, a PPS material, a PPSU material, a polyphenylene material, a PA material, and a PAI material; thermoset plastic material, such as one or more of a PI material, a PU material, a phenol-formaldehyde material, a urea-formaldehyde material, and a polyester material), a glass material, a carbon-containing material, and a boron-containing material. In some embodiments, the matrix material comprises an epoxy material. The matrix material may constitute from about 10 vol % to about 90 vol % (e.g., from about 25 vol % to about 75 vol %, from about 40 vol % and about 60 vol %, etc.) of the fiber composite material structures 102.

Each of the tiers 106 may include any desired thickness (e.g., height) of the fiber composite material structure 102 therein, such as a thickness less than or equal to about 0.030 inch (about 762 micrometers (μm)) (e.g., less than or equal to about 0.020 inch (about 508 μm)), less than or equal to about 0.015 inch (about 381 μm), less than or equal to about 0.005 inch (about 127 μm), less than or equal to about 0.003 inch (about 76.2 µm), less than or equal to about 0.001 inch (about 25.4 µm); etc. In tiers 106 (e.g., the second tier 106b, the fourth tier 106d, the sixth tier 106f, the eighth tier 106h, etc.) including at least one fiber composite material structure 102 and at least one metallic structure 104, the thickness of the fiber composite material structure 102 may correspond to (e.g., be substantially the same as) a thickness of the metallic structure 104. In some embodiments, a thickness of a fiber composite material structure 102 of a given tier 106 is an integral number (e.g., an integer multiple, such as a 1× multiple, a 2× multiple, a 3× multiple, etc.) of a thickness of a metallic structure 104 of the given tier 106. As non-limiting example, a thickness of a fiber composite material structure 102 of a given tier 106 may be a 1× multiple of a metallic structure 104 of the given tier 106. If, for example, the metallic structure 104 of the given tier 106 exhibits a thickness of about 0.01 inch (about 254 µm), the fiber composite material structure 102 of the given tier 106 may also exhibit a thickness of about 0.01 inch (about 254 µm). Accordingly, upper ends (e.g., upper boundaries, upper surfaces, etc.) of the metallic structure 104 and the fiber composite material structure 102 of the given tier 106 may be substantially coplanar with one another. As another non-limiting example, a thickness of a fiber composite material structure 102 of a given tier 106 may be a 2× multiple of a metallic structure 104 of the given tier 106. If, for example, the metallic structure 104 of the given tier 106 exhibits a thickness of about 0.01 inch (about 254 µm), the fiber composite material structure 102 of the given tier 106 may exhibit a thickness of about 0.02 inch (about 508 µm). In some embodiments, in each of the tiers 106 including at least one fiber composite material structure 102 and at least one metallic structure 104, a thickness of the at least one fiber composite material structure 102 is a 1× multiple of a thickness of the at least one metallic structure 104, such that upper ends of the at least one fiber composite material structure 102 and the at least one metallic structure 104 are substantially coplanar with one another.

Each of the fiber composite material structures 102 of the HMC structure 100 may have substantially the same material composition and thickness, or at least one of the fiber composite material structures 102 of the HMC structure 100 may have one or more of a different material composition and a different thickness than at least one other of the fiber composite material structures 102. In some embodiments, each of the fiber composite material structures 102 has substantially the same material composition and thickness as each other of the fiber composite material structures 102. In additional embodiments, each of the fiber composite material structures 102 exhibits substantially the same material composition, but at least one of the fiber composite material structures 102 exhibits a different thickness than at least one other of the fiber composite material structures 102. In further embodiments, each of the fiber composite material structures 102 exhibits substantially the same thickness, but at least one of the fiber composite material structures 102 exhibits a different material composition than at least one other of the fiber composite material structures 102. In yet further embodiments, one or more (e.g., each) of the fiber composite material structures 102 exhibits a different material composition and a different thickness than one or more (e.g., each) other of the fiber composite material structures 102.

With continued reference to FIG. 1, each of the metallic structures 104 may be formed of and include a metal-containing material capable of imparting the HMC structure 100 with enhanced strength and structural integrity as compared to composite material structures not including the metallic structures 104. For example, each of the metallic structures 104 may be formed of and include iron (Fe), cobalt (Co), nickel (Ni), copper (Cu), aluminum (Al), magnesium (Mg), titanium (Ti), tungsten (W), molybdenum (Mo), niobium (Nb), vanadium (V), hafnium (Hf), tantalum (Ta), chromium (Cr), zirconium (Zr), silicon (Si), alloys thereof, carbides thereof, nitrides thereof, oxides thereof, or combinations thereof. As a non-limiting example, one or more (e.g., each) of the metallic structures 104 may be formed of and include an elemental metal, such as one or more of elemental Al, elemental Ti, elemental Hf, elemental Ta, elemental Cr, and elemental W. As another non-limiting example, one or more (e.g., each) of the metallic structures 104 may be formed of and include a metal alloy, such as one or more of an Fe-containing alloy, a Ni-containing alloy, a Co-containing alloy, an Fe- and Ni-containing alloy, a Co- and Ni-containing alloy, an Fe- and Co-containing alloy, an Al-containing alloy, a Cu-containing alloy, an Mg-containing alloy, and a Ti-containing alloy. In some embodiments, one or more (e.g., each) of the metallic structures 104 are formed of and include elemental Ti. In additional embodiments, one or more (e.g., each) of the metallic structures 104 are formed of and include an Fe-containing alloy (e.g., a steel-alloy, such as a stainless steel, a mild steel, etc.). Each of the metallic structures 104 may have substantially the same material composition, or at least one of the metallic structures 104 may have a different material composition than at least one other of the metallic structures 104.

The metallic structures 104 may have material properties (e.g., mechanical properties, rheological properties, physical properties, chemical properties, etc.) substantially compatible with material properties of the fiber composite material structures 102. By way of non-limiting example, one or more (e.g., each) of the metallic structures 104 may have one or more of a coefficient of thermal expansion, an elastic (e.g., Young's) modulus, a bulk modulus, a tensile strength, a hardness, a thermal resistance, an abrasion resistance, and a chemical resistance substantially similar to that of one or more of the fibers and the matrix material of one or more (e.g., each) of the fiber composite material structures 102. In some embodiments, each of the metallic structures 104 has a coefficient of thermal expansion within a range of from about $3 \times 10^{-6}$/K to about $25 \times 10^{-6}$/K at about 25° C., and a coefficient of thermal expansion of at least the matrix material of each of the fiber composite material structures 102 is within a range of from about $3 \times 10^{-6}$/K to about $150 \times 10^{-6}$/K at about 25° C. (e.g., from about $45 \times 10^{-6}$/K to about $65 \times 10^{-6}$/K at about 25° C.).

The HMC structure 100 may include any suitable number (e.g., quantity) of the metallic structures 104. For clarity and ease of understanding of the drawings and related description, FIG. 1 shows the HMC structure 100 as including four (4) metallic structures 104 (i.e., the first metallic structure 104a in the second tier 106b, the second metallic structure 104b in the fourth tier 106d, the third metallic structure 104c in the sixth tier 106f, and the fourth metallic structure 104d in the eighth tier 106h). However, the HMC structure 100 may include a different number of metallic structures 104. For example, in additional embodiments, the HMC structure 100 may include greater than four (4) metallic structures 104 (e.g., greater than or equal to five (5) metallic structures 104, greater than or equal to nine (9) metallic structures 104, greater than or equal to fifteen (15) metallic structures 104, or greater than or equal to twenty-five (25) metallic structures 104), or may include less than four (4) metallic structures 104 (e.g., three (3) metallic structures 104, or two (2) metallic structures 104). The metallic structures 104 may constitute from about from about 5 vol % to about 50 vol % (e.g., from about 15 vol % to about 50 vol %, from about 25 vol % to about 45 vol %, etc.) of the HMC structure 100. In some embodiments, the metallic structures constitute from about 25 vol % to about 45 vol % the of the HMC structure 100.

Each of the metallic structures 104 may individually exhibit any peripheral shape compatible with a desired end use of the HMC structure 100. By way of non-limiting example, the metallic structures 104 may exhibit one or more of rectangular peripheral shapes, square peripheral shapes, trapezoidal peripheral shapes, annular peripheral shapes, circular peripheral shapes, semicircular peripheral shapes, crescent peripheral shapes, ovular peripheral shapes, astroidal peripheral shapes, deltoidal peripheral shapes, ellipsoidal peripheral shapes, triangular peripheral shapes, parallelogram peripheral shapes, kite peripheral shapes, rhomboidal peripheral shapes, pentagonal peripheral shapes, hexagonal peripheral shapes, heptagonal peripheral shapes, octagonal peripheral shapes, enneagonal peripheral shapes, decagonal peripheral shapes, truncated versions thereof, and irregular peripheral shapes. In some embodiments, one or more (e.g., each) of the metallic structures 104 exhibits a generally rectangular peripheral shape. Each of the metallic structures 104 may exhibit substantially the same peripheral shape, or at least one of the metallic structures 104 may exhibit a different peripheral shape than at least one other of the metallic structures 104.

Peripheral dimensions (e.g., width, length, and height) and positions (e.g., lateral positions, longitudinal positions) of each of the metallic structures 104 may be selected relative to peripheral dimensions and positions of each other of the metallic structures 104 to provide the HMC structure 100 with one or more desirable properties (e.g., strength, structural integrity, etc.). For example, as described in further detail below, lateral peripheral dimensions (e.g., widths) and lateral positions of the metallic structures 104 may be selected such that first lateral ends 108 of at least some the metallic structures 104 are laterally offset from the first lateral ends 108 of at least some other of the metallic structures 104, and/or such that second lateral ends 110 (e.g., ends opposing the first lateral ends 108) of at least some the metallic structures 104 are laterally offset from the second lateral ends 110 of at least some other of the metallic structures 104. Offsetting the first lateral ends 108 and/or the second lateral ends 110 of at least some of the metallic structures 104 within different tiers 106 than one another may offset stress concentration points within the different tiers 106, so as to decrease the likelihood of damage to the HMC structure 100 while under load as compared to HMC structures not exhibiting such configurations.

The metallic structures 104 may each individually exhibit peripheral dimensions (e.g., width, length, height) permitting the metallic structures 104 to enhance the strength and mechanical (e.g., structural) integrity of the HMC structure 100 as compared to conventional HMC structures. A width (e.g., lateral dimension in the X-direction) of each of the metallic structures 104 may be selected at least partially based on the widths and positions of each other of the metallic structures 104 to permit at least some lateral ends (e.g., at least some of the first lateral ends 108, at least some of the second lateral ends 110) of two or more metallic structures 104 in different tiers 106 than one another to be laterally offset from one another. In addition, each of the metallic structures 104 may individually exhibit a thickness (e.g., height, dimension in the Z-direction) less than or equal to about 0.050 inch (about 1270 micrometers (μm)), such as within a range of from about 0.001 inch (about 25.4 μm) to about 0.030 inch (about 762 μm) (e.g., from about 0.003 inch (about 76.2 μm) to about 0.020 inch (about 508 μm), from 0.005 inch (about 127 μm) to about 0.015 inch (about 381 μm), etc.). In some embodiments, one or more (e.g., each) of the metallic structures 104 exhibits a thickness of about 0.01 inch (about 254 μm).

The metallic structures 104 may each exhibit substantially the same peripheral dimensions (e.g., substantially the same width, substantially the same length, and substantially the same height), or at least one of the metallic structures 104 may exhibit one or more different peripheral dimensions (e.g., a different width, a different length, and/or a different height) than at least one other of the metallic structures 104. As shown in FIG. 1, in some embodiments, a width (e.g., lateral dimension in the X-direction) of a metallic structure 104 within at least one of the tiers 106 (e.g., one or more of the second tier 106b, the fourth tier 106d, the sixth tier 106f, and the eighth tier 106h) may be different than (e.g., larger than, smaller than) a width of another metallic structure 104 within at least one other of the tiers 106 (e.g., one or more other of the second tier 106b, the fourth tier 106d, the sixth tier 106f, and the eighth tier 106h). By way of non-limiting example, the first metallic structure 104a within the second tier 106b and the third metallic structure 104c within the sixth tier 106f may each individually exhibit a different width (e.g., a smaller width) than widths of the second metallic structure 104b within the fourth tier 106d and the fourth metallic structure 104d within the eighth tier 106h. In additional embodiments, each of the metallic structures 104 may exhibit substantially with same width.

A lateral position (e.g., a position in the X-direction) of each of the metallic structures 104 may be selected at least partially based on the lateral positions and peripheral dimensions of each other of the metallic structures 104 to permit at least some lateral ends (e.g., at least some first lateral ends 108, at least some second lateral ends 110) of two or more metallic structures 104 in different tiers 106 than one another to be laterally offset from one another. Metallic structures 104 in different tiers 106 than one another may be substantially laterally aligned (e.g., in the X-direction) with one another other, or at least some of the metallic structures 104 in different tiers 106 than one another may be laterally unaligned (e.g., in the X-direction) with one another other. In some embodiments, lateral centers of at least some (e.g., all) metallic structures 104 in different tiers 106 than one another are substantially aligned with one another. By way of non-limiting example, as shown in FIG. 1, lateral centers of the first metallic structure 104a within the second tier 106b, the second metallic structure 104b within the fourth tier 106d, the third metallic structure 104c within the sixth tier 106f, and the fourth metallic structure 104d within the eighth tier 106h may be substantially aligned with one another. In additional embodiments, lateral centers of at least some (e.g., all) metallic structures 104 in different tiers 106 than one another are unaligned with one another. By way of non-limiting example, in additional embodiments, lateral centers of one or more of the first metallic structure 104a within the second tier 106b, the second metallic structure 104b within the fourth tier 106d, the third metallic structure 104c within the sixth tier 106f, and the fourth metallic structure 104d within the eighth tier 106h are unaligned with lateral centers of one or more other of the first metallic structure 104a within the second tier 106b, the second metallic structure 104b within the fourth tier 106d, the third metallic structure 104c within the sixth tier 106f, and the fourth metallic structure 104d within the eighth tier 106h.

As shown in FIG. 1, at least some metallic structures 104 longitudinally neighboring (e.g., longitudinally most proximate) one another within different tiers 106 may exhibit offset (e.g., unaligned) lateral ends (e.g., offset first lateral ends 108, offset second lateral ends 110) relative to each other. By way of non-limiting example, a first lateral end 108a and a second lateral end 110a of the first metallic structure 104a within the second tier 106b may respectively be laterally offset from a first lateral end 108b and a second lateral end 110b of the second metallic structure 104b within the fourth tier 106d; the first lateral end 108b and the second lateral end 110b of the second metallic structure 104b may respectively be laterally offset from a first lateral end 108c and a second lateral end 110c of the third metallic structure 104c within the sixth tier 106f, and the first lateral end 108c and the second lateral end 110c of the third metallic structure 104c may respectively be laterally offset from a first lateral end 108d and a second lateral end 110d of the fourth metallic structure 104d within the eighth tier 106h. Lateral distances between offset lateral ends of longitudinally neighboring metallic structures 104 may at least partially depend on the thicknesses of the longitudinally neighboring metallic structures 104. In some embodiments, a lateral distance between offset lateral ends of longitudinally neighboring metallic structures 104 is greater than or equal to about ten times (10×) a thickness of at least one of the longitudinally neighboring metallic structures 104. By way of non-limiting example, if at least one of two longitudinally neighboring metallic structures 104 (e.g., the first metallic structure 104a and the second metallic structure 104b; the second metallic structure 104b and the third metallic structure 104c; the third metallic structure 104c and the fourth metallic structure 104d) exhibits a thickness of about 0.01 inch (about 254 μm) a lateral distance between offset lateral ends (e.g., between the first lateral end 108a of the first metallic structure 104a and the first lateral end 108b of the second metallic structure 104b; between the first lateral end 108b of the second metallic structure 104b and the first lateral end 108c of the third metallic structure 104c; between the first lateral end 108c of the third metallic structure 104c and the first lateral end 108d of the fourth metallic structure 104d) of the of the two longitudinally neighboring metallic structures 104 may be greater than or equal to about 0.1 inch (about 2540 μm).

Lateral offsets (e.g., lateral distances) between lateral ends (e.g., first lateral ends 108, second lateral ends 110) of longitudinally neighboring metallic structures 104 may be substantially uniform throughout the thickness of the HMC structure 100, or may be at least partially (e.g., substantially) non-uniform throughout the thickness of the HMC structure 100. In some embodiments, lateral offsets between at least some lateral ends of longitudinally neighboring metallic structures 104 are substantially uniform (e.g., substantially the same) throughout the thickness of the HMC structure 100. For example, lateral distances between the first lateral ends 108 of longitudinally neighboring metallic structures 104 may be substantially uniform throughout the thickness of the HMC structure 100, and/or lateral distances between the second lateral ends 110 of longitudinally neighboring metallic structures 104 may be substantially uniform throughout the thickness of the HMC structure 100. In some embodiments, the first lateral ends 108 of longitudinally neighboring metallic structures 104 are uniformly laterally offset from one another throughout the thickness of the HMC structure 100 by a distance of about 0.1 inch (about 2540 μm). In additional embodiments, the second lateral ends 110 of longitudinally neighboring metallic structures 104 are uniformly laterally offset from one another throughout the thickness of the HMC structure 100 by a distance of about 0.1 inch (about 2540 μm). In further embodiments, lateral offsets between at least some lateral ends of longitudinally neighboring metallic structures 104 are non-uniform (e.g., different, variable) throughout the thickness of the HMC structure 100. For example, lateral distances between the first lateral ends 108 of at least some longitudinally neighboring metallic structures 104 may be different than (e.g., greater than, less than) lateral distances between the first lateral ends 108 of at least some other longitudinally neighboring metallic structures 104, and/or lateral distances between the second lateral ends 110 of at least some longitudinally neighboring metallic structures 104 may be different than (e.g., greater than, less than) lateral distances between the second lateral ends 110 of at least some other longitudinally neighboring metallic structures 104.

Lateral ends of at least some non-longitudinally neighboring metallic structures 104 (e.g., metallic structures 104 having at least one other metallic structure 104 longitudinally intervening therebetween) may be substantially aligned (e.g., substantially coplanar) with one another, and/or lateral ends of at least some non-longitudinally neighboring metallic structures 104 may be laterally offset from one another. In some embodiments, lateral ends of at least some non-longitudinally neighboring metallic structures 104 are substantially aligned with one another. By way of non-limiting example, the first lateral end 108a and the second lateral end 110a of the first metallic structure 104a within the second tier 106b may respectively be substantially laterally aligned with the first lateral end 108c and a second lateral end 110c of the third metallic structure 104c within the sixth tier 106f, and the first lateral end 108b and the second lateral end 110b of the second metallic structure 104b within the fourth tier 106d may respectively be substantially laterally aligned with the first lateral end 108d and the second lateral end 110d of the fourth metallic structure 104d within the eighth tier 106h.

The HMC structure 100 may exhibit any sizes, lateral positions, and arrangement (e.g., sequence, pattern) of the metallic structures 104 facilitating lateral offsets between at least some lateral ends (e.g., at least some first lateral ends 108, at least some second lateral ends 110) of longitudinally neighboring metallic structures 104 throughout the thickness of the HMC structure 100. By way of non-limiting example, as shown in FIG. 1, the HMC structure 100 may include an alternating sequence of relatively smaller metallic structures 104 (e.g., the first metallic structure 104a, the third metallic structure 104c) and relatively larger metallic structures 104 (e.g., the second metallic structure 104b, the fourth metallic structure 104d), wherein lateral centers of the relatively smaller metallic structures 104 and the relatively larger metallic structures 104 are substantially aligned with one another. As described in further detail below, in additional embodiments, the HMC structure 100 may exhibit one or more of different sizes, different lateral positions, and a different arrangement of the metallic structures 104 than that depicted in FIG. 1.

As previously described above, the HMC structure 100 may be formed to exhibit a different configuration than that depicted in FIG. 1. By way of non-limiting example, FIGS. 2 through 7 show simplified cross-sectional views of different HMC structures, in accordance with additional embodiments of the disclosure. Throughout the remaining description and the accompanying figures, functionally similar features (e.g., structures) are referred to with similar reference numerals incremented by 100. To avoid repetition, not all features shown in FIGS. 2 through 7 are described in detail herein. Rather, unless described otherwise below, a feature designated by a reference numeral that is a 100 increment of the reference numeral of a previously-described feature (whether the previously-described feature is first described before the present paragraph, or is first described after the present paragraph) will be understood to be substantially similar to the previously-described feature.

Figure 2:
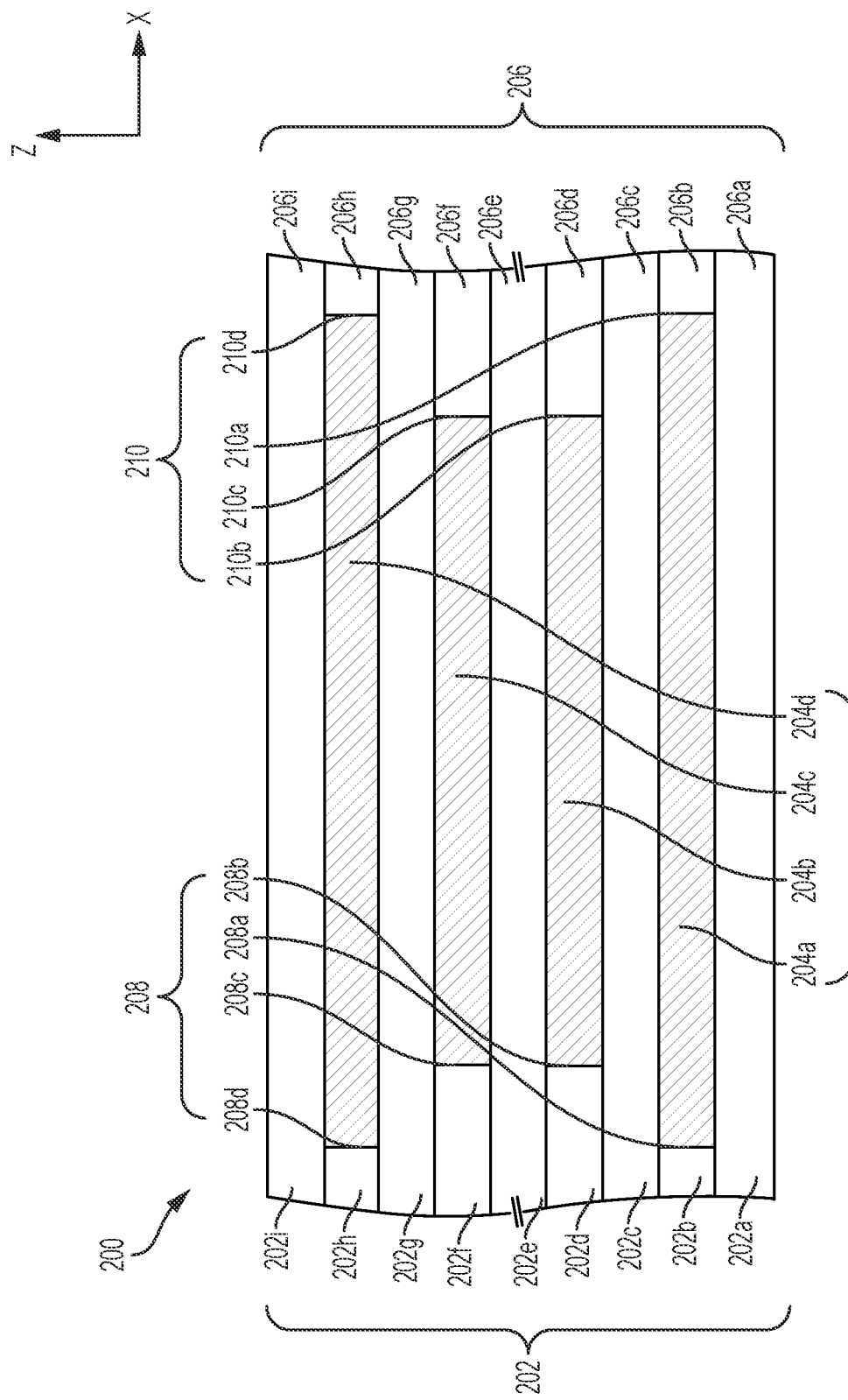

FIG. 2 illustrates a simplified cross-sectional view of an HMC structure 200, in accordance with another embodiment of the disclosure. The HMC structure 200 is similar to the HMC structure 100 shown in FIG. 1, except that the HMC structure 200 may exhibit a different arrangement of the metallic structures 204 thereof. As shown in FIG. 2, the HMC structure 200 may include an at least partially non-alternating sequence of relatively smaller metallic structures 204 (e.g., a second metallic structure 204b, a third metallic structure 204c) and relatively larger metallic structures 204 (e.g., a first metallic structure 204a, a fourth metallic structure 204d), wherein lateral centers of the relatively smaller metallic structures 204 and the relatively larger metallic structures 204 are substantially aligned with one another. For example, the HMC structure 200 may include a first metallic structure 204a; a second metallic structure 204b centrally laterally aligned with and overlying the first metallic structure 204a and having a relatively smaller width than the first metallic structure 204a; a third metallic structure 204c centrally laterally aligned with and overlying the second metallic structure 204b and having a relatively smaller width than the first metallic structure 204a (e.g., substantially the same width as the second metallic structure 204b); and a fourth metallic structure 204d centrally laterally aligned with and overlying the third metallic structure 204c and having a relatively larger width than the third metallic structure 204c (e.g., substantially the same width as the first metallic structure 204a). In some embodiments, widths of the metallic structures 204 increase in directions (e.g., a positive Z-direction, a negative Z-direction) extending longitudinally outward from a longitudinal center of the HMC structure 200. By way of non-limiting example, the first metallic structure 204a, which is more distal from the longitudinal center of the HMC structure 200 than second metallic structure 204b, may exhibit a larger width than the second metallic structure 204b; and the fourth metallic structure 204d, which is more distal from the longitudinal center of the HMC structure 200 than third metallic structure 204c, may exhibit a larger width than the third metallic structure 204c. In addition, lateral ends (e.g., first lateral ends 208, second lateral ends 210) of some, but not all, longitudinally neighboring metallic structures 204 within different tiers 206 of the HMC structure 200 may be substantially aligned with one another. For example, as shown in FIG. 2, a first lateral end 208b and a second lateral end 210b of the second metallic structure 204b within the fourth tier 206d of the HMC structure 200 may respectively be substantially aligned (e.g., substantially coplanar) with a first lateral end 208c and a second lateral end 210c of the third metallic structure 204c within the sixth tier 206f of the HMC structure 200.

Figure 3:
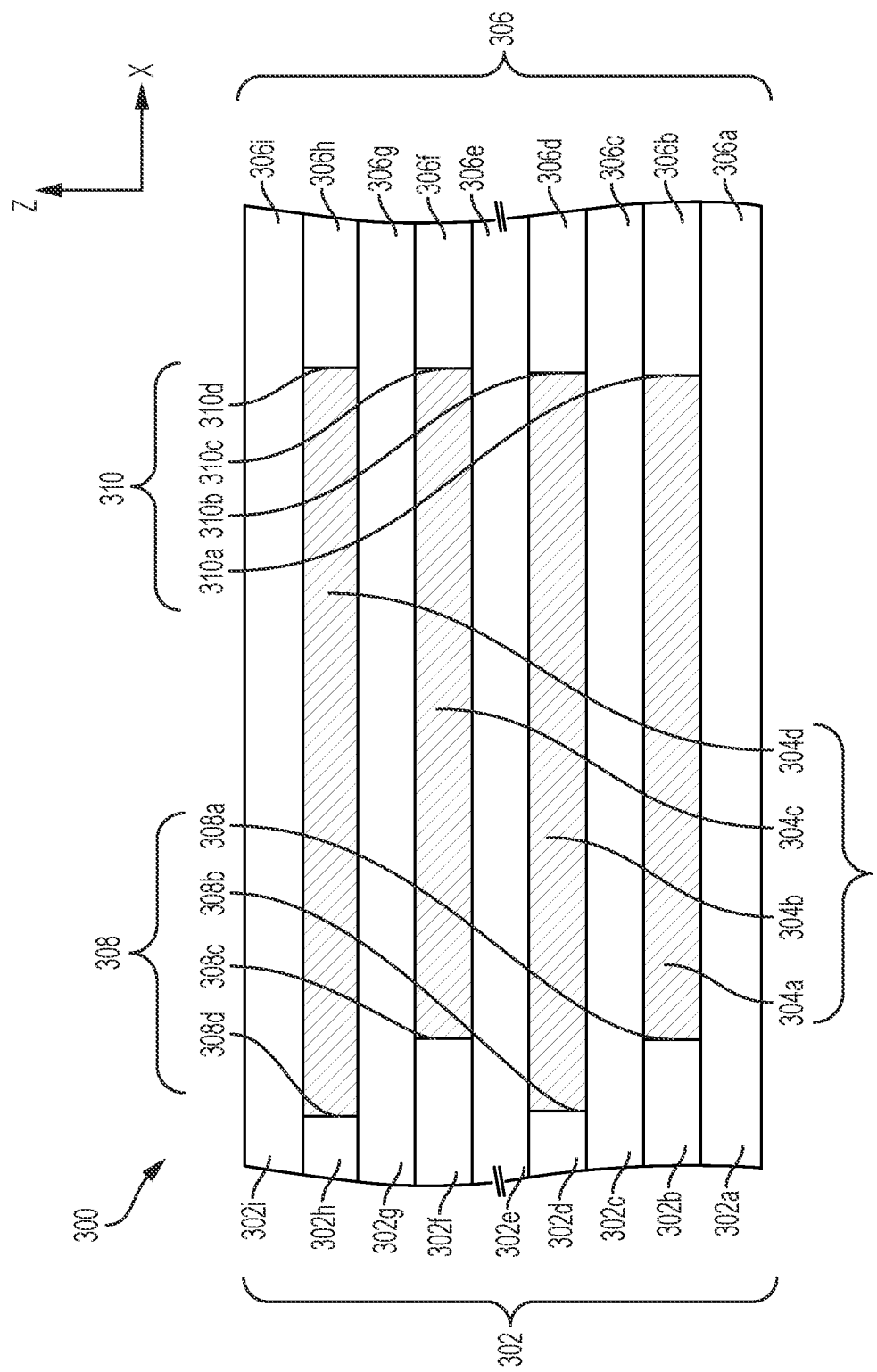

FIG. 3 illustrates a simplified cross-sectional view of an HMC structure 300, in accordance with another embodiment of the disclosure. The HMC structure 300 is similar to the HMC structure 100 shown in FIG. 1, except that second lateral ends 310 of metallic structures 304 of the HMC structure 300 may all be substantially aligned with one another. As shown in FIG. 3, widths of the first metallic structure 304a and the third metallic structure 304c may be increased relative to the widths of the first metallic structure 104a and the third metallic structure 104c shown in FIG. 1, such that a second lateral end 310a of the first metallic structure 304a and a second lateral end 310c of the third metallic structure 304c are substantially aligned with a second lateral end 310b of the second metallic structure 304b and a second lateral end 310d of the fourth metallic structure 304d. Lateral centers of some of the first metallic structures 304a may be substantially aligned with one another, and may be unaligned with other of the first metallic structures 304a. For example, a lateral center of the first metallic structure 304a may be substantially laterally aligned with that of the third metallic structure 304c, and a lateral center of the second metallic structure 304b may be substantially laterally aligned with that of the fourth metallic structure 304d, but lateral centers of the first metallic structure 304a and the third metallic structure 304c may be laterally unaligned with (e.g., laterally offset from) those of the second metallic structure 304b and the fourth metallic structure 304d. As shown in FIG. 3, first lateral ends 308 of at least some metallic structures 304 longitudinally neighboring one another within different tiers 306 of the HMC structure 300 may be laterally offset from one another (e.g., in a manner similar to that previously described in relation to FIG. 1).

Figure 4:
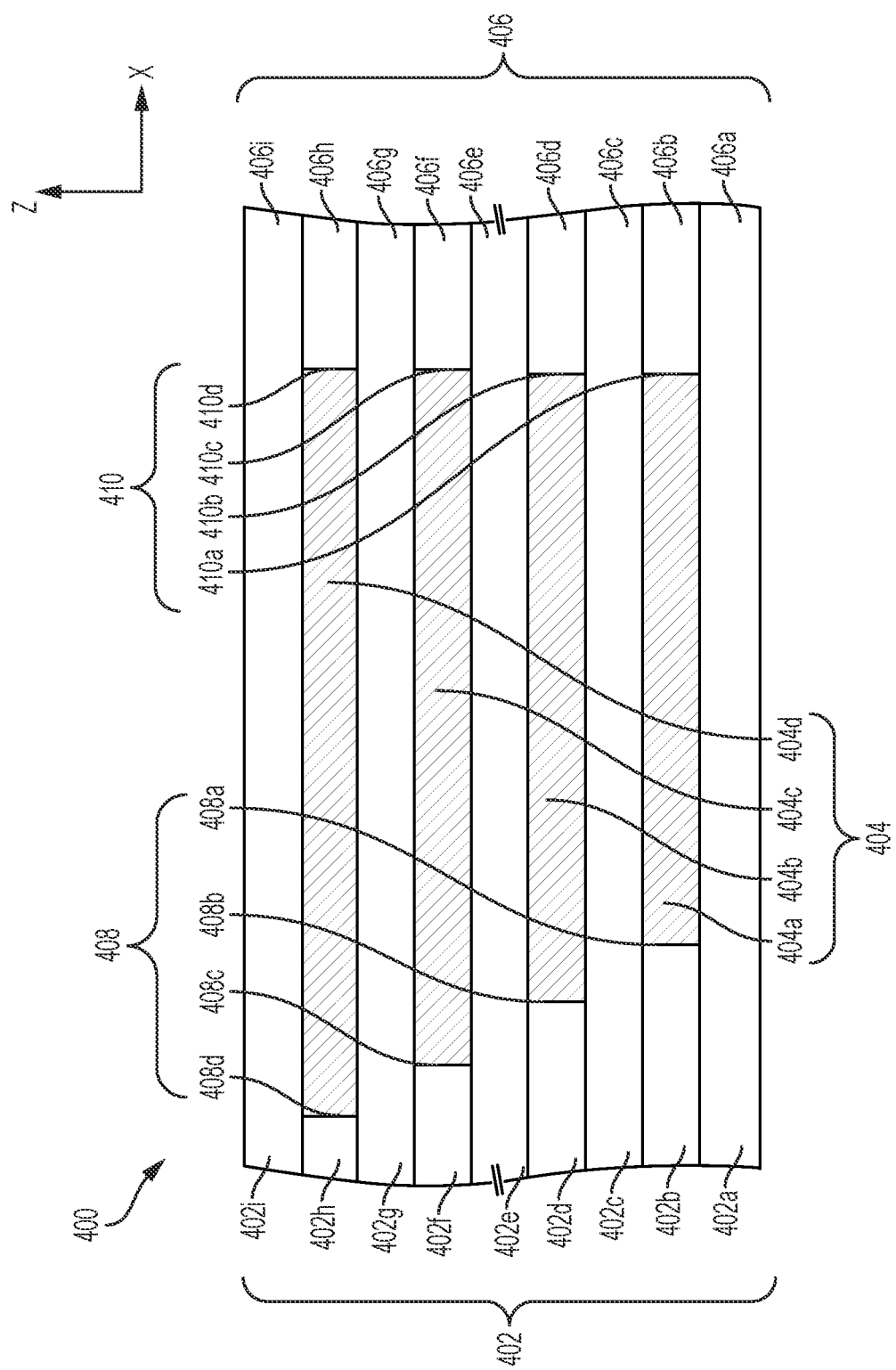

FIG. 4 illustrates a simplified cross-sectional view of an HMC structure 400, in accordance with another embodiment of the disclosure. The HMC structure 400 is similar to the HMC structure 300 shown in FIG. 3, except that metallic structures 404 of the HMC structure 400 each individually exhibit a larger width than each other of the metallic structures 404 thereunder. For example, as shown in FIG. 4, a second metallic structure 404b within a fourth tier 406d of the HMC structure 400 may exhibit a larger width than a first metallic structure 404a within a second tier 406b of the HMC structure 400; a third metallic structure 404c within a sixth tier 406f of the HMC structure 400 may exhibit a larger width than the second metallic structure 404b within the fourth tier 406d of the HMC structure 400; and a fourth metallic structure 404d within an eighth tier 406h of the HMC structure 400 may exhibit a larger width than the third metallic structure 404c within the sixth tier 406f of the HMC structure 400. First lateral ends 408 and lateral centers of each of the metallic structures 404 may respectively be laterally offset (e.g., in the negative X-direction) from first lateral ends 408 and lateral centers of each other of the metallic structures 404 thereunder. For example, a first lateral end 408b and a lateral center of the second metallic structure 404b may respectively be positioned laterally outward of (e.g., in the negative X-direction) a first lateral end 408a and a lateral center of the first metallic structure 404a thereunder; a first lateral end 408c and a lateral center of the third metallic structure 404c may respectively be positioned laterally outward of the first lateral end 408b and the lateral center of the second metallic structure 404b; and a first lateral end 408d and a lateral center of the fourth metallic structure 404d may respectively be positioned laterally outward of the first lateral end 408c and the lateral center of the third metallic structure 404c. In additional embodiments, each of the metallic structures 404 exhibits a smaller width than each other of the metallic structures 404 thereunder. As shown in FIG. 4, second lateral ends 410 of the metallic structures 404 may all be substantially aligned with one another (e.g., in a manner similar to that previously described in relation to FIG. 3).

Figure 5:
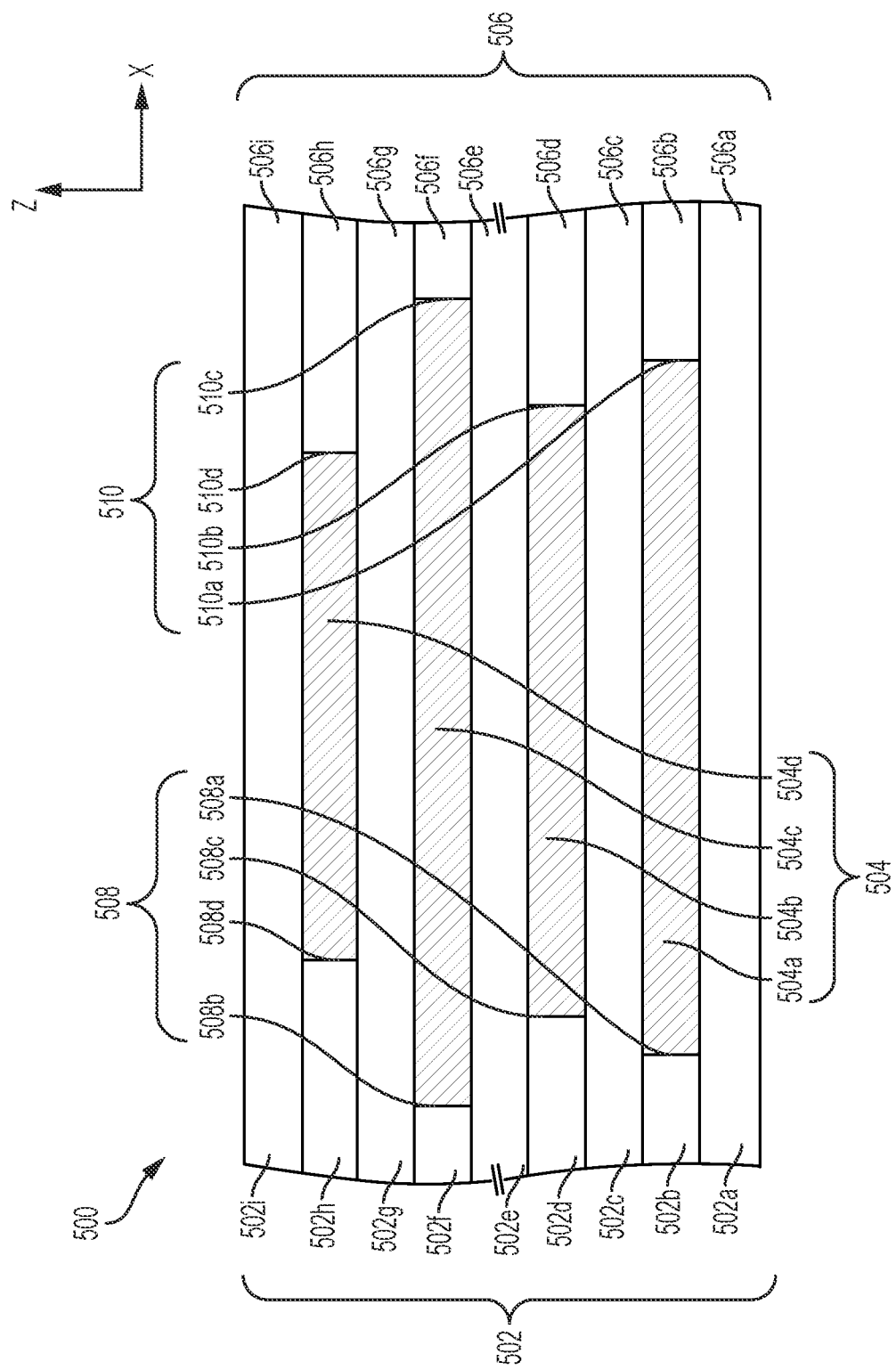

FIG. 5 illustrates a simplified cross-sectional view of an HMC structure 500, in accordance with another embodiment of the disclosure. The HMC structure 500 is similar to the HMC structure 100 shown in FIG. 1, except that metallic structures 504 of the HMC structure 500 may exhibit different configurations than the metallic structures 104 of the HMC structure 100. As shown in FIG. 5, the metallic structures 504 may exhibit different widths than one another, and lateral centers of the metallic structures 504 may be substantially aligned with one another. For example, the HMC structure 500 may include a first metallic structure 504a; a second metallic structure 504b centrally laterally aligned with and overlying the first metallic structure 504a and having a different width (e.g., a smaller width, a larger width) than the first metallic structure 504a; a third metallic structure 504c centrally laterally aligned with and overlying the second metallic structure 504b and having a different width (e.g., a smaller width, a larger width) than the second metallic structure 504b; and a fourth metallic structure 504d centrally laterally aligned with and overlying the third metallic structure 504c and having a different width (e.g., a smaller width, a larger width) than the third metallic structure 504c. In some embodiments, each of the metallic structures 504 exhibits a different width than each other of the metallic structures 504, and lateral ends (e.g., first lateral ends 508, second lateral ends 510) of all longitudinally neighboring metallic structures 504 within different tiers 506 of the HMC structure 500 are unaligned (e.g., non-coplanar) with one another. In additional embodiments, less than all of the metallic structures 504 exhibit different widths than one another, and/or lateral ends of some (but not all) longitudinally neighboring metallic structures 504 within different tiers 506 of the HMC structure 500 are aligned (e.g., substantially coplanar) with one another.

Figure 6:
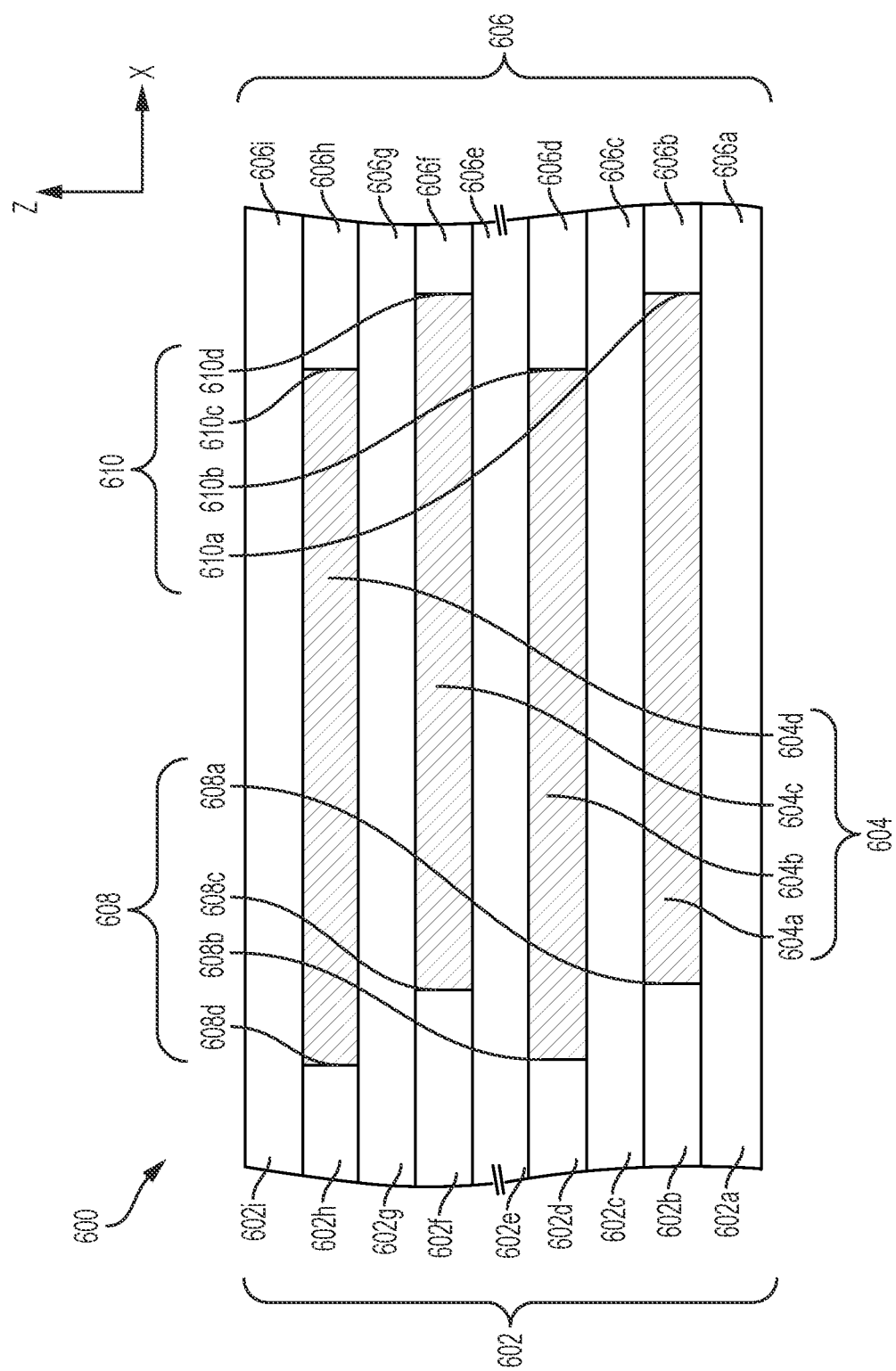

FIG. 6 illustrates a simplified cross-sectional view of an HMC structure 600, in accordance with another embodiment of the disclosure. The HMC structure 600 is similar to the HMC structure 100 shown in FIG. 1, except that metallic structures 604 of the HMC structure 600 may exhibit different configurations and lateral positions than the metallic structures 104 of the HMC structure 100. As shown in FIG. 6, the metallic structures 604 may exhibit substantially the same width as one another, and lateral centers of some of the metallic structures 604 may be laterally offset from other of the metallic structures 604. For example, the HMC structure 600 may include a first metallic structure 604a; a second metallic structure 604b partially laterally unaligned with (e.g., partially laterally offset from) and overlying the first metallic structure 604a and having substantially the same width as the first metallic structure 604a; a third metallic structure 604c partially laterally unaligned with and overlying the second metallic structure 604b and having substantially the same width as the second metallic structure 604b; and a fourth metallic structure 604d partially laterally unaligned with and overlying the third metallic structure 604c and having substantially the same width as the third metallic structure 604c. Lateral ends (e.g., first lateral ends 608, second lateral ends 610) of longitudinally neighboring metallic structures 604 within different tiers 606 of the HMC structure 600 may be laterally offset from one another. By way of non-limiting example, a first lateral end 608a and a second lateral end 610a of the first metallic structure 604a within the second tier 606b may respectively be laterally offset from a first lateral end 608b and a second lateral end 610b of the second metallic structure 604b within the fourth tier 606d; the first lateral end 608b and the second lateral end 610b of the second metallic structure 604b may respectively be laterally offset from a first lateral end 608c and a second lateral end 610c of the third metallic structure 604c within the sixth tier 606f; and the first lateral end 608c and the second lateral end 610c of the third metallic structure 604c may respectively be laterally offset from a first lateral end 608d and a second lateral end 610d of the fourth metallic structure 604d within the eighth tier 606h. In addition, lateral ends of at least some non-longitudinally neighboring metallic structures 604 may be substantially aligned with one another, and/or lateral ends of at least some non-longitudinally neighboring metallic structures 604 may be laterally offset from one another. In some embodiments, lateral ends of at least some non-longitudinally neighboring metallic structures 604 are substantially aligned with one another. By way of non-limiting example, the first lateral end 608a and the second lateral end 610a of the first metallic structure 604a may respectively be substantially laterally aligned with the first lateral end 608c and a second lateral end 610c of the third metallic structure 604c; and the first lateral end 608b and the second lateral end 610b of the second metallic structure 604b may respectively be substantially laterally aligned with the first lateral end 608d and the second lateral end 610d of the fourth metallic structure 604d within the eighth tier 606h.

Figure 7:
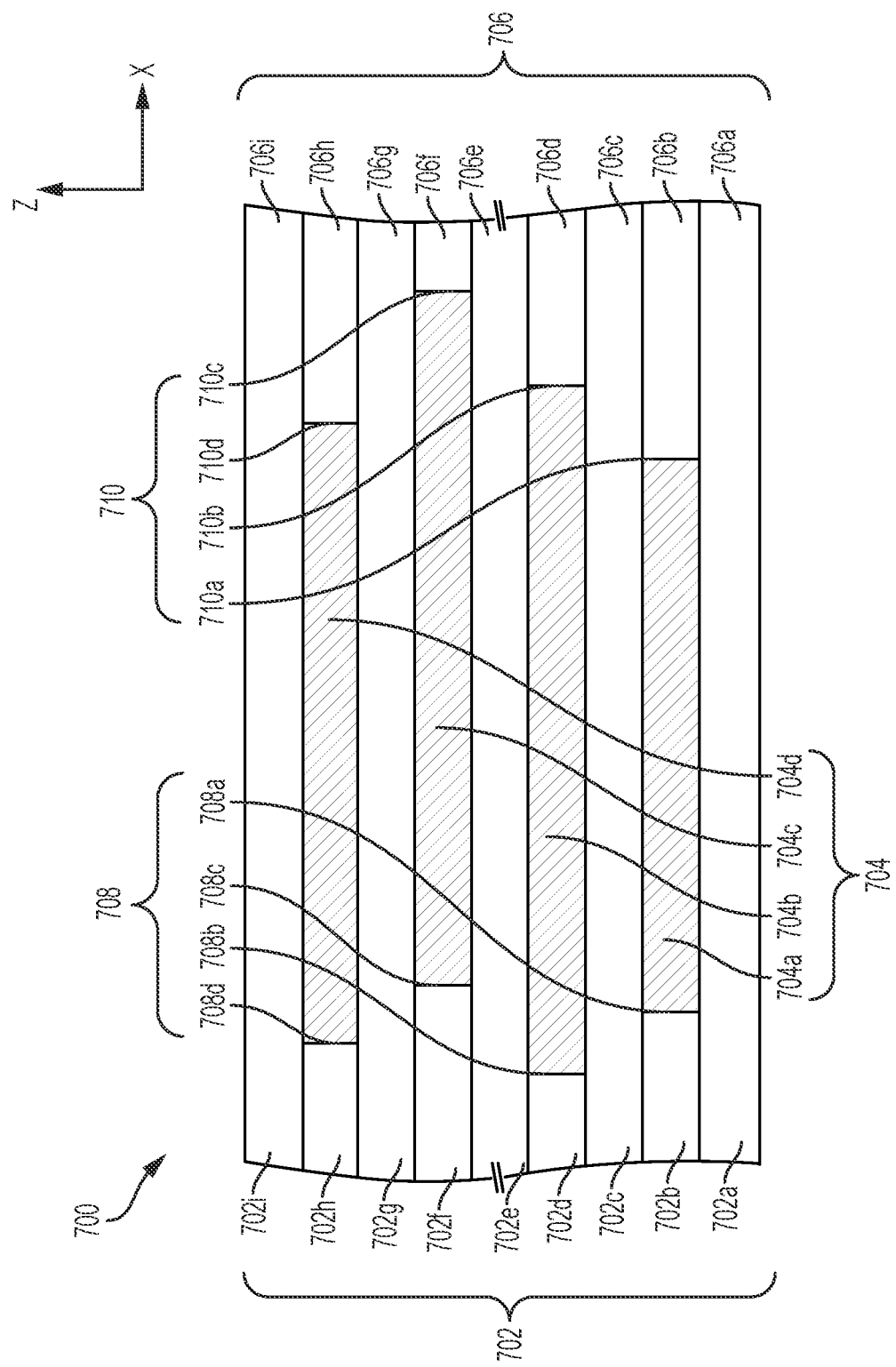

FIG. 7 illustrates a simplified cross-sectional view of an HMC structure 700, in accordance with another embodiment of the disclosure. The HMC structure 700 is similar to the HMC structure 100 shown in FIG. 1, except that metallic structures 704 of the HMC structure 700 may exhibit different configurations and positions than the metallic structures 104 of the HMC structure 100. As shown in FIG. 7, the metallic structures 704 may exhibit different widths than one another, and lateral centers of the metallic structures 704 may be offset from one another. For example, the HMC structure 700 may include a first metallic structure 704a; a second metallic structure 704b partially laterally unaligned with (e.g., partially laterally offset from) and overlying the first metallic structure 704a and having a different (e.g., larger, smaller) width than the first metallic structure 704a; a third metallic structure 704c partially laterally unaligned with and overlying the second metallic structure 704b and having a different (e.g., larger, smaller) width than the second metallic structure 704b; and a fourth metallic structure 704d partially laterally unaligned with and overlying the third metallic structure 704c and having a different (e.g., larger, smaller) width than the third metallic structure 704c. Lateral ends (e.g., first lateral ends 708, second lateral ends 710) of longitudinally neighboring metallic structures 704 within different tiers 706 of the HMC structure 700 may be laterally offset from one another. By way of non-limiting example, a first lateral end 708a and a second lateral end 710a of the first metallic structure 704a within the second tier 706b may respectively be laterally offset from a first lateral end 708b and a second lateral end 710b of the second metallic structure 704b within the fourth tier 706d; the first lateral end 708b and the second lateral end 710b of the second metallic structure 704b may respectively be laterally offset from a first lateral end 708c and a second lateral end 710c of the third metallic structure 704c within the sixth tier 706f; and the first lateral end 708c and the second lateral end 710c of the third metallic structure 704c may respectively be laterally offset from a first lateral end 708d and a second lateral end 710d of the fourth metallic structure 704d within the eighth tier 706h. In addition, lateral ends of at least some non-longitudinally neighboring metallic structures 704 may be laterally offset from one another, and/or lateral ends of at least some non-longitudinally neighboring metallic structures 704 may be substantially laterally aligned with one another. In some embodiments, lateral ends of at least some (e.g., all) non-longitudinally neighboring metallic structures 704 are laterally offset from one another. By way of non-limiting example, each of the first lateral ends 708 of the metallic structures 704 may be laterally offset from the each other of the first lateral ends 708 of the metallic structures 704, and each of the second lateral ends 710 of the metallic structures 704 may be laterally offset from the each other of the second lateral ends 710 of the metallic structures 704.

Figure 8:
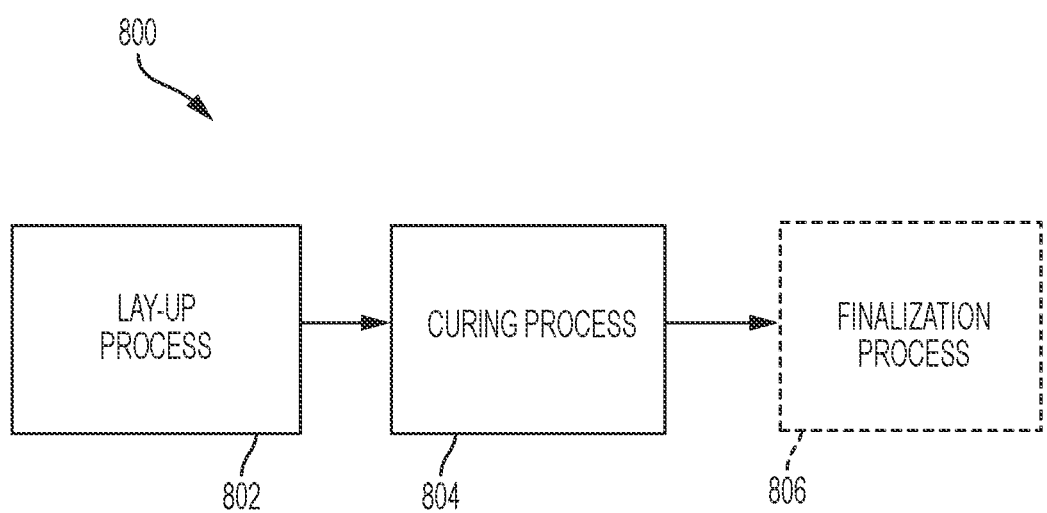
FIG. 8 is a simplified flow diagram illustrating a method of forming one or more of the HMC structures shown in FIGS. 1 through 7, in accordance with embodiments of the disclosure.

FIG. 8 is a simplified flow diagram illustrating a method 800 of forming the HMC structures of the disclosure (e.g., the HMC structures 100, 200, 300, 400, 500, 600, 700 shown in FIGS. 1-7), in accordance with embodiments of the disclosure. The method 800 may include a lay-up process 802 including forming an uncured HMC structure exhibiting the general structure of an HMC structure of the disclosure on or over a surface of a substrate, a curing process 804 including curing the uncured HMC structure to form the HMC structure, and, optionally, a finalization process 806 including further treating (e.g., densifying, cutting, machining, coating, etc.) the HMC structure. With the description as provided below, it will be readily apparent to one of ordinary skill in the art that the method described herein may be used in various applications. In other words, the method may be used whenever it is desired to form an HMC structure.

The lay-up process 802 includes forming a first tier (e.g., corresponding to one of the first tiers 106a, 206a, 306a, 406a, 506a, 606a, 706a of the HMC structures 100, 200, 300, 400, 500, 600, 700 shown in FIGS. 1-7) including uncured fiber composite material on or over at least one surface of a substrate, forming a second tier (e.g., corresponding to one of the second tiers 106b, 206b, 306b, 406b, 506b, 606b, 706b of the HMC structures 100, 200, 300, 400, 500, 600, 700 shown in FIGS. 1-7) including additional uncured fiber composite material and at least one metallic structure (e.g., corresponding to one of the first metallic structures 104a, 204a, 304a, 404a, 504a, 604a, 704a shown in FIGS. 1-7) on or over the first tier, forming a third tier (e.g., corresponding to one of the third tiers 106c, 206c, 306c, 406c, 506c, 606c, 706c of the HMC structures 100, 200, 300, 400, 500, 600, 700 shown in FIGS. 1-7) including additional uncured fiber composite material on or over the second tier, forming a fourth tier (e.g., corresponding to one of the fourth tiers 106d, 206d, 306d, 406d, 506d, 606d, 706d of the HMC structures 100, 200, 300, 400, 500, 600, 700 shown in FIGS. 1-7) including additional uncured fiber composite material and at least one additional metallic structure (e.g., corresponding to one of the second metallic structures 104b, 204b, 304b, 404b, 504b, 604b, 704b shown in FIGS. 1-7) on or over the third tier, and so on to form an uncured HMC structure exhibiting a desired configuration (e.g., size, shape, features, feature spacing, components, component arrangement, etc.) generally corresponding to a desired configuration of an HMC structure (e.g., one of the HMC structures 100, 200, 300, 400, 500, 600, 700 shown in FIGS. 1-7) to be subsequently formed therefrom.

The uncured fiber composite material of the first tier may be formed on or over the surface of the substrate using one or more conventional lay-up processes (e.g., a resin transfer molding (RTM) process, a hand placement process, a filament winding process, etc.) and conventional processing equipment, which are not described in detail herein. As a non-limiting example, the uncured composite material may be formed on or over the substrate using an RTM process wherein fibers are placed into a mold in a desired arrangement, the mold is evacuated, an uncured matrix material (e.g., uncured resin) is introduced into the mold under pressure, and the temperature of the mold is controlled to permit the resin to set and form the uncured composite material. As another non-limiting example, the uncured composite material may be formed on or over the substrate using a hand placement process wherein fiber preforms (e.g., fiber tapes, fiber sheets, woven fiber fabrics, etc.) infiltrated with a uncured matrix material (e.g., uncured resin) are placed by hand on or over the substrate in a desired arrangement to form the uncured composite material. As an additional non-limiting example, the uncured composite material may be formed on or over the substrate using a filament winding process wherein fiber tows infiltrated with an uncured matrix material (e.g., uncured resin) are wound on or over the substrate using a filament winding apparatus. The substrate may comprise any structure exhibiting a desired geometric configuration (e.g., size, and shape), that is chemically and mechanically compatible with the uncured fiber composite material, and that is capable of withstanding the processing conditions (e.g., temperatures, pressures, ambient environment, etc.) used to form the uncured fiber composite material on or over the surface thereof. By way of non-limiting example, the substrate may comprise a mold core (e.g., a mandrel), another fiber composite material, a metal material, a ceramic material, at least a portion of a mold, or another material. In addition, the substrate may have any desired shape (e.g., flat, concave, convex, cylindrical, etc.) or combination of shapes. In some embodiments, the substrate comprises at least a portion of the subsequently formed HMC structure (e.g., at least a portion of one of the HMC structures 100-700 shown in FIGS. 1-7). In other embodiments, the substrate in absent (e.g., omitted) from the subsequently formed HMC structure.

Each of the metallic structure and the additional uncured fiber composite material of the second tier may be formed on or over the uncured fiber composite material of the first tier using one or more conventional lay-up processes and conventional processing equipment, which are not described in detail herein. By way of non-limiting example, the metallic structure may be provided on or over the uncured fiber composite material of the first tier by a hand placement process, and the additional uncured fiber composite material may be formed laterally adjacent the metallic structure and on or over the uncured fiber composite material of the first tier by one or more of an RTM process, a hand placement process, and a filament winding process. The metallic structure and the additional uncured fiber composite material of the second tier may be formed to exhibit substantially the same thickness as one another.

The additional uncured fiber composite material of the third tier may be formed on or over the metallic structure and the additional uncured fiber composite material of the second tier using one or more conventional lay-up processes and conventional processing equipment, which are not described in detail herein. By way of non-limiting example, additional uncured fiber composite material of the third tier may be formed on or over the metallic structure and the additional uncured fiber composite material of the second tier by one or more of an RTM process, a hand placement process, and a filament winding process. The additional uncured fiber composite material of the third tier may substantially cover an upper surface of the metallic structure of the second tier.

Each of the additional metallic structure and the additional uncured fiber composite material of the fourth tier may be formed on or over the uncured fiber composite material of the third tier using one or more conventional lay-up processes and conventional processing equipment, which are not described in detail herein. By way of non-limiting example, the additional metallic structure may be provided on or over the uncured fiber composite material of the third tier by a hand placement process, and the additional uncured fiber composite material may be formed laterally adjacent the additional metallic structure and on or over the uncured fiber composite material of the third tier by one or more of an RTM process, a hand placement process, and a filament winding process. The additional metallic structure of the fourth tier may be laterally positioned relative to the metallic structure of the second tier to facilitate desired lateral offset of one or more lateral ends (e.g., a first lateral end, a second lateral end) of the additional metallic structure relative to one or more corresponding lateral ends (e.g., a first lateral end, a second lateral end) of the metallic structure. Furthermore, the additional metallic structure and the additional uncured fiber composite material of the fourth tier may be formed to exhibit substantially the same thickness as one another.

One or more of the processes used to form the first tier, the second tier, the third tier, and the fourth tier may be repeated to form one or more additional tiers (e.g., the fifth tier, the sixth tier, the seventh tier, the eighth tier, a ninth tier, etc.) of the uncured HMC structure. By way of non-limiting example, a fifth tier (e.g., corresponding to one of the fifth tiers 106e, 206e, 306e, 406e, 506e, 606e, 706e of the HMC structures 100, 200, 300, 400, 500, 600, 700 shown in FIGS. 1-7) including additional uncured fiber composite material may be formed on or over the fourth tier using one or more processes (e.g., an RTM process, a hand placement process, a filament winding process, etc.) substantially similar to those used to form the third tier, a sixth tier (e.g., corresponding to one of the sixth tiers 106f, 206f, 306f, 406f, 506f, 606f, 706f of the HMC structures 100, 200, 300, 400, 500, 600, 700 shown in FIGS. 1-7) including at least one additional metallic structure and additional uncured fiber composite material may be formed on or over the fifth tier using one or more processes substantially similar to those used to form the fourth tier, a seventh tier (e.g., corresponding to one of the seventh tiers 106g, 206g, 306g, 406g, 506g, 606g, 706g of the HMC structures 100, 200, 300, 400, 500, 600, 700 shown in FIGS. 1-7) including additional uncured fiber composite material may be formed on or over the sixth tier using one or more processes substantially similar to those used to form the third tier, an eighth tier (e.g., corresponding to one of the eighth tiers 106h, 206h, 306h, 406h, 506h, 606h, 706h of the HMC structures 100, 200, 300, 400, 500, 600, 700 shown in FIGS. 1-7) including at least one additional metallic structure and additional uncured fiber composite material may be formed on or over the seventh tier using one or more processes substantially similar to those used to form the fourth tier, and a ninth tier (e.g., corresponding to one of the ninth tiers 106i, 206i, 306i, 406i, 506i, 606i, 706i of the HMC structures 100, 200, 300, 400, 500, 600, 700 shown in FIGS. 1-7) including additional uncured fiber composite material may be formed on or over the eighth tier using one or more processes substantially similar to those used to form the third tier.

With continued reference to FIG. 8, the curing process 804 may include subjecting the uncured HMC structure to at least one of elevated temperature(s) and elevated pressure(s) (e.g., using a curing apparatus, such as a autoclave, a compression mold, or a lamination press) for a sufficient period of time to substantially cure the uncured HMC structure and form the HMC structure (e.g., one of the HMC structures 100, 200, 300, 400, 500, 600, 700 shown in FIGS. 1-7). By way of non-limiting example, the uncured HMC structure may be exposed to a temperature within a range of from about 20° C. (e.g., about room temperature) to about 300° C. (e.g., from about 20° C. to about 50° C., from about 50° C. to about 100° C., from about 100° C. to about 200° C., from about 200° C. to about 300° C., etc.) for a period of time within a range of from about 30 minutes to about three (3) days (e.g., from about 30 minutes to about two (2) hours, from about two (2) hours to about twelve (12) hours, from about twelve (12) hours to about twenty-four (24) hours, from about twenty-four (24) hours to about two (2) days, from about two (2) days to about three (3) days) to cure the uncured HMC structure and form the HMC structure.

The finalization process 806, if performed, may include subjecting the HMC structure to one or more of a machining process, a densification process (e.g., a sintering process), a material conversion process (e.g., a pyrolyzation process), and a coating process. In some embodiments, the finalization process 806 is performed following the curing process 804, and at least includes subjecting the HMC structure to at least one machining process to remove one or more portions of the HMC structure.

If performed, the machining process may include one or more of boring, cutting (e.g., trimming), and planarizing the HMC structure. In some embodiments, the HMC structure is subjected to at least one boring process to form one or more holes sized and configured to receive fasteners (e.g., bolts) within the HMC structure. In additional embodiments, the HMC structure is subjected to at least one cutting process (e.g., at least grinding wheel cutting process) to permit the HMC structure to be mechanically coupled to at least one other structure (e.g., another HMC structure). The cutting process may trim (e.g., remove) a portion of the HMC structure, such that lateral ends (e.g., the second lateral ends 110, 210, 310, 410, 510, 610, 710 of the HMC structures 100, 200, 300, 400, 500, 600, 700 shown in FIGS. 1-7) of the metallic structures thereof (e.g., the metallic structures 104, 204, 304, 404, 504, 604, 704 of the HMC structures 100, 200, 300, 400, 500, 600, 700 shown in FIGS. 1-7) are positioned proximate an end of the HMC structure. The lateral ends of the metallic structures may terminate at the end of the HMC structure following the cutting process, or may be laterally offset from the end of the HMC structure following the cutting process. If the lateral ends of the metallic structures are laterally offset from the end of the HMC structure following the cutting process, each of the metallic structures may be laterally offset from the end of the HMC structure by substantially the same distance, or at least one of the metallic structures may be laterally offset from the end of the HMC structure by a different distance than at least one other of the metallic structures. In some embodiments, each of the metallic structures is laterally offset from the end of the HMC structure by substantially the same distance following the cutting process. The cutting process may trim portions of the metallic structures and the fiber composite material structures of the HMC structure, or may only trim portions the fiber composite material structures of the HMC structure. For example, in some embodiments wherein lateral ends of the metallic structures to be positioned proximate an end of the HMC structure are at least partially offset from one another (e.g., such as the second lateral ends 110, 210, 510, 610, 710 of the HMC structures 100, 200, 500, 600, 700 shown in FIGS. 1, 2, 5, 6, and 7), the cutting process trims portions of the metallic structures and the fiber composite material structures of the HMC structure such that the resulting, newly formed lateral ends of the metallic structures positioned proximate the end of the HMC structure are substantially aligned (e.g., substantially coplanar) with one another. As another example, in some embodiments wherein the lateral ends of the metallic structures to be positioned proximate an end of the HMC structure are substantially aligned with one another (e.g., such as the second lateral ends 310, 410 of the HMC structures 300, 400 shown in FIGS. 3 and 4), the cutting process only trims portions of the fiber composite material structures proximate the lateral ends of the metallic structures (e.g., the metallic structures are not be trimmed by the cutting process). Only trimming portions of the fiber composite material structures during the cutting process may avoid problems (e.g., undesirable heating of the metal structures, undesirable delamination of the fiber composite material structures from the metal structures, etc.) that may otherwise occur if the metallic structures are also trimmed during the cutting process.

Whether or not the HMC structure is subjected to one or more of a densification process and a material conversion process at least partially depends on the material composition of the matrix material of the fiber composite material structures of the tiers of the HMC structure. As a non-limiting example, if the fiber composite material structures include an oxide-based ceramic matrix material, the HMC structure may be sintered (e.g., at temperature within a range of from about 1000° C. to about 1350° C.) to densify the HMC structure. As another non-limiting example, if the fiber composite material structures include a cured non-oxide-based pre-ceramic matrix material, the HMC structure may be pyrolyzed (e.g., at temperature within a range of from about 600° C. to about 1400° C.) convert at least a portion of the cured non-oxide-based pre-ceramic matrix material into a non-oxide-based ceramic matrix material.

Figure 9:
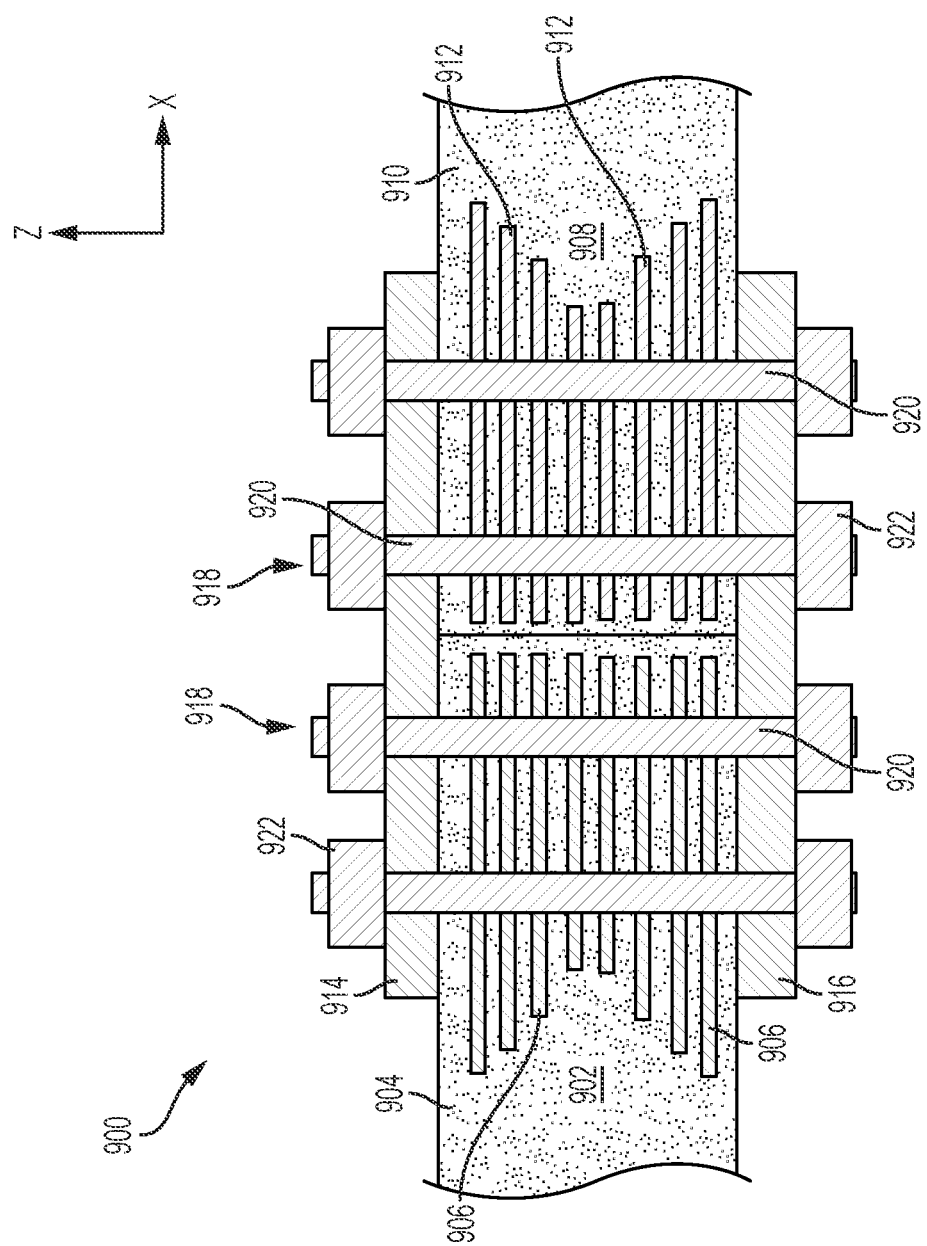
FIG. 9 is a cross-sectional view of an assembled, multi-component structure including coupled HMC structures, in accordance with embodiments of the disclosure.

FIG. 9 is a cross-sectional view of an assembled, multi-component structure 900 including a first HMC structure 902, a second HMC structure 908 laterally adjacent the first HMC structure 902, an outer joining structure 914 overlying portions of the first HMC structure 902 and the second HMC structure 908, an inner joining structure 916 underlying portions of the first HMC structure 902 and the second HMC structure 908, and fasteners 918 extending through the outer joining structure 914, the first HMC structure 902, the second HMC structure 908, and the inner joining structure 916. The outer joining structure 914, the inner joining structure 916, and the fasteners 918 may operatively couple the first HMC structure 902 to the second HMC structure 908.

As shown in FIG. 9, the first HMC structure 902 includes tiers of fiber composite material structures 904 and metallic structures 906. The configurations (e.g., material compositions, peripheral sizes, peripheral shapes, components, component sizes, component shapes, component spacing, component features, component feature sizes, component feature shapes, component feature spacing, component feature density, component feature patterning, etc.) and positions of the fiber composite material structures 904 and the metallic structures 906 may be substantially the same as, or may be different than the configurations and positions of the fiber composite material structures (e.g., the fiber composite material structures 102, 202, 302, 402, 502, 602, 702) and the metallic structures (e.g., the metallic structures 104, 204, 304, 404, 504, 604, 704) of one of the HMC structures (e.g., one of the HMC structures 100, 200, 300, 400, 500, 600, 700) previously described with respect to FIGS. 1-7. In addition, as also shown in FIG. 9, the second HMC structure 908 includes tiers of additional fiber composite material structures 910 and additional metallic structures 912. The configurations (e.g., material compositions, peripheral sizes, peripheral shapes, spacing, features, feature sizes, feature shapes, feature spacing, feature density, feature patterning, etc.) and positions of the additional fiber composite material structures 910 and the additional metallic structures 912 may be substantially the same as, or may be different than the configurations and positions of the fiber composite material structures (e.g., fiber composite material structures 102, 202, 302, 402, 502, 602, 702) and the metallic structures (e.g., metallic structures 104, 204, 304, 404, 504, 604, 704) of one of the HMC structures (e.g., one of the HMC structures 100, 200, 300, 400, 500, 600, 700) previously described with respect to FIGS. 1-7. The configurations of the first HMC structure 902 and the second HMC structure 908 may be substantially the same as one another, or may be different than one another. In some embodiments, the first HMC structure 902 and the second HMC structure 908 mirror one another. As used herein, the term "mirror" means and includes that at least two structures are mirror images of one another. For example, the first HMC structure 902 and the second HMC structure 908 may exhibit substantially the same material compositions, peripheral sizes, peripheral shapes, components (e.g., fiber composite material structures, metallic structures, etc.), component sizes, component shapes, component spacing, component features (e.g., perforations in the metallic structures thereof), component feature sizes, component feature shapes, component feature spacing, component feature density, and component feature patterning as one another, but the first HMC structure 902 may outwardly extend in a direction that opposes a direction in which the second HMC structure 908 outwardly extends. As shown in FIG. 9, in some embodiments, the metallic structures 906 of the first HMC structure 902 and the additional metallic structures 912 of the second HMC structure 908 are laterally positioned proximate an interface of the first HMC structure 902 and the second HMC structure 908, and do not laterally extend across entireties of the first HMC structure 902 and the second HMC structure 908.

With continued reference to FIG. 9, the fasteners 918 may include elongate structures 920 (e.g., bolts, rods, studs, pins, etc.) and capping structures 922 (e.g., nuts, heads, etc.) coupled to ends of the elongate structures 920. The elongate structures 920 of a first portion of the fasteners 918 may longitudinally extend through the outer joining structure 914, the first HMC structure 902, and the inner joining structure 916. As shown in FIG. 9, the elongate structures 920 of the first portion of the fasteners 918 may longitudinally extend through the metallic structures 906 of the first HMC structure 902. The metallic structures 906 may enhance the bearing strength between the first HMC structure 902 and the elongate structures 920 of the first portion of the fasteners 918. In addition, the elongate structures 920 of the second portion of the fasteners 918 may longitudinally extend through the outer joining structure 914, the second HMC structure 908, and the inner joining structure 916. As also shown in FIG. 9, the elongate structures 920 of the second portion of the fasteners 918 may longitudinally extend through the additional metallic structures 912 of the second HMC structure 908. The additional metallic structures 912 may enhance the bearing strength between the second HMC structure 908 and the elongate structures 920 of the second portion of the fasteners 918.

Figure 10:
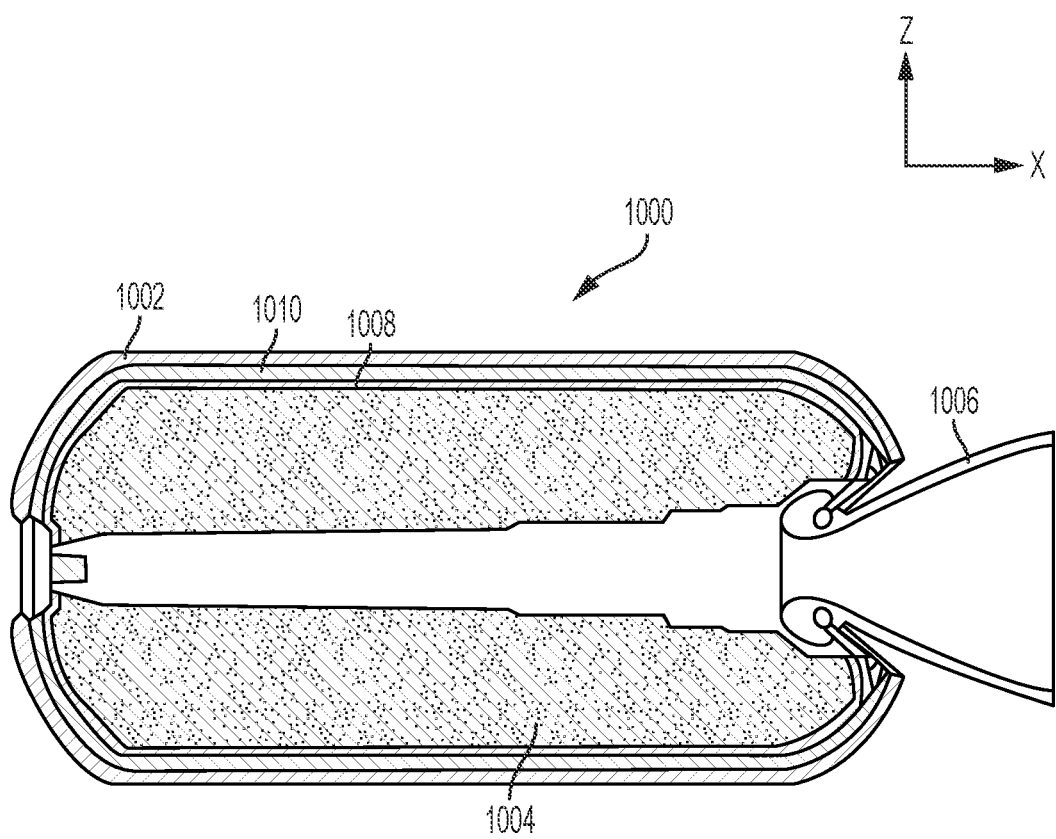
FIG. 10 is a simplified cross-sectional view of a rocket motor including one or more HMC structures, in accordance with embodiments of the disclosure.

FIG. 10 is a simplified cross-sectional view of a rocket motor 1000 (e.g., a solid rocket motor), in accordance with embodiments of the disclosure. The rocket motor 1000 may, for example, be configured to be a component (e.g., stage) of a larger assembly (e.g., a multi-stage rocket motor assembly), as described in further detail below. As shown in FIG. 10, the rocket motor 1000 may include a casing 1002, a propellant structure 1004 disposed within the casing 1002, a nozzle assembly 1006 connected to an aft end of the casing 1002. The rocket motor 1000 may also include one or more of a liner structure 1008 and an insulation structure 1010 between the propellant structure 1004 and the casing 1002. For example, the liner structure 1008 may be located on or over the propellant structure 1004, and the insulation structure 1010 may be located on and between the liner structure 1008 and an inner surface of the casing 1002.

The casing 1002 may be formed of and include one or more HMC structures, such as one or more of the HMC structures 100, 200, 300, 400, 500, 600, 700, 902, and 908 previously described with respect to FIGS. 1-7 and 9. For example, the casing 1002 may be formed of and include at least two (2) HMC structures coupled (e.g., connected) to one another in a manner substantially similar to that previously described with reference to FIG. 9 for connecting the first HMC structure 902 to the second HMC structure 908. Forming the casing 1002 from a plurality of coupled HMC structures may permit at least some of the coupled HMC structures to be reused following the use of the rocket motor 1000.

The propellant structure 1004 may be formed of and include at least one propellant material, such as at least one solid propellant. Various examples of suitable solid propellants and components thereof are described in Thakre et al., *Solid Propellants*, Rocket Propulsion, Vol. 2, Encyclopedia of Aerospace Engineering, John Wiley & Sons, Ltd. 2010, the disclosure of which document is hereby incorporated herein in its entirety by this reference. The solid propellant may be a class 4.1, 1.4 or 1.3 material, as defined by the United States Department of Transportation shipping classification, so that transportation restrictions are minimized. By way of non-limiting example, the propellant of the propellant structure 1004 may be formed of and include a polymer having one or more of a fuel and an oxidizer incorporated therein. The polymer may be an energetic polymer or a non-energetic polymer, such as glycidyl nitrate (GLYN), nitratomethylmethyloxetane (NMMO), glycidyl azide (GAP), diethyleneglycol triethyleneglycol nitraminodiacetic acid terpolymer (9DT-NIDA), bis(azidomethyl)-oxetane (BAMO), azidomethylmethyl-oxetane (AMMO), nitraminomethyl methyloxetane (NAMMO), bis(difluoroaminomethyl)oxetane (BFMO), difluoroaminomethylmethyloxetane (DFMO), copolymers thereof, cellulose acetate, cellulose acetate butyrate (CAB), nitrocellulose, polyamide (nylon), polyester, polyethylene, polypropylene, polystyrene, polycarbonate, a polyacrylate, a wax, a hydroxyl-terminated polybutadiene (HTPB), a hydroxyl-terminated poly-ether (HTPE), carboxyl-terminated polybutadiene (CTPB) and carboxyl-terminated polyether (CTPE), diaminoazoxy furazan (DAAF), 2,6-bis(picrylamino)-3,5-dinitropyridine (PYX), a polybutadiene acrylonitrile/acrylic acid copolymer binder (PBAN), polyvinyl chloride (PVC), ethylmethacrylate, acrylonitrile-butadiene-styrene (ABS), a fluoropolymer, polyvinyl alcohol (PVA), or combinations thereof. The polymer may function as a binder, within which the one or more of the fuel and oxidizer is dispersed. The fuel may be a metal, such as aluminum, nickel, magnesium, silicon, boron, beryllium, zirconium, hafnium, zinc, tungsten, molybdenum, copper, or titanium, or alloys mixtures or compounds thereof, such as aluminum hydride ($AlH_3$), magnesium hydride ($MgH_2$), or borane compounds ($BH_3$). The metal may be used in powder form. The oxidizer may be an inorganic perchlorate, such as ammonium perchlorate or potassium perchlorate, or an inorganic nitrate, such as ammonium nitrate or potassium nitrate. Other oxidizers may also be used, such as hydroxylammonium nitrate (HAN), ammonium dinitramide (ADN), hydrazinium nitroformate, a nitramine, such as cyclotetramethylene tetranitramine (HNX), cyclotrimethylene trinitramine (RDX), 2,4,6,8,10, 12-hexanitro-2,4,6,8,10,12-hexaazaisowurtzitane (CL-20 or HNIW), and/or 4,10-dinitro-2,6,8,12-tetraoxa-4,10-diazatetracyclo-[5.5.0.0$^{5,9}$.0$^{3,11}$]-dodecane (TEX). In addition, the propellant of the propellant structure 1004 may include additional components, such as one or more of a plasticizer, a bonding agent, a combustion rate modifier, a ballistic modifier, a cure catalyst, an antioxidant, and a pot life extender, depending on the desired properties of the propellant. These additional components are well known in the rocket motor art and, therefore, are not described in detail herein. The components of the propellant of the propellant structure 1004 may be combined by conventional techniques, which are not described in detail herein.

With continued reference to FIG. 10, nozzle assembly 1006 may be cooperatively associated with the casing 1002 and the propellant structure 1004 so as to produce a desired thrust. The nozzle assembly 1006 may be stationary (e.g., fixed), or may be adjustable to selectively alter the course of flight of the rocket motor 1000 (and, hence, of a launch vehicle including the rocket motor 1000). In some embodiments, the nozzle assembly 1006 includes a thrust nozzle, a flexible bearing assembly connected to the thrust nozzle and the casing 1002, and at least one actuator connected to the thrust nozzle. Lateral movement of the flexible bearing assembly by way of the actuator may be used to modify the position of the thrust nozzle so as to control the direction of the rocket motor 1000 (and, hence, of a launch vehicle including the rocket motor 1000) during use and operation (e.g., flight) thereof. Suitable configurations (e.g., components, component shapes, component sizes, component materials, component arrangements, etc.) for the nozzle assembly 1006 are well known in the rocket motor art and, therefore, are not described in detail herein.

Figure 11:
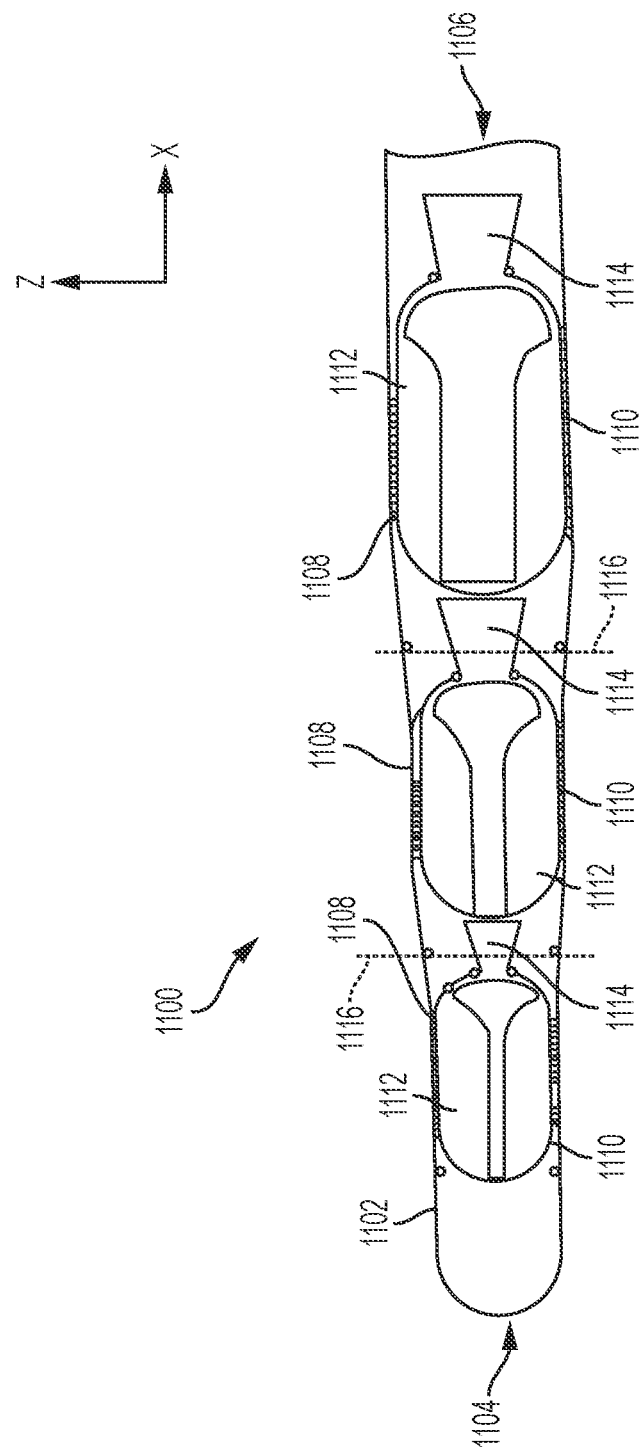
FIG. 11 is a simplified cross-sectional view of a multi-stage rocket motor assembly including one or more HMC structures, in accordance with embodiments of the disclosure.

FIG. 11 is a cross-sectional view of a multi-stage rocket motor assembly 1100, in accordance with an embodiment of the disclosure. The multi-stage rocket motor assembly 1100 may include an outer housing 1102 having a closed forward end 1104 and an open aft end 1106. The outer housing 1102 may formed of and include one or more HMC structures, such as one or more of the HMC structures 100, 200, 300, 400, 500, 600, 700, 902, and 908 previously described with respect to FIGS. 1 through 7 and 9. For example, the outer housing 1102 may be formed of and include at least two (2) HMC structures coupled (e.g., connected) to one another in a manner substantially similar to that previously described with reference to FIG. 9 for connecting the first HMC structure 902 to the second HMC structure 908. The multi-stage rocket motor assembly 1100 may also include plurality of stages 1108 provided in an end-to-end relationship with one another within the outer housing 1102. For example, as shown in FIG. 11, the multi-stage rocket motor assembly 1100 may include three (3) stages 1108 each contained within the outer housing 1102. In additional embodiments, the multi-stage rocket motor assembly 1100 may include a different number of stages 1108, such as from one (1) stage to ten (10) stages. The stages 1108 may include casings 1110, propellant structures 1112 with the casings 1110, and nozzle assemblies 1114 physically connected to aft ends of the casings 1110. One or more of the stages 1108 may be substantially similar to the rocket motor 1000 previously described with reference to FIG. 10. The outer housing 1102 may be configured to be severable at locations 1116, as indicated by dashed lines, associated with the stages 1108 during use and operation of the multi-stage rocket motor assembly 1100 (e.g., following combustion of the propellant structure 1112 within a given one of the stages 1108).

The HMC structures (e.g., the HMC structure 100, 200, 300, 400, 500, 600, 700 shown in FIGS. 1-7) of the disclosure may exhibit improved properties as compared to conventional fiber composite material structures. For example, the HMC structures including the configurations and positions of the metallic structures (e.g., the metallic structures 104, 204, 304, 404, 504, 604, 704 shown in FIGS. 1-7) of the disclosure may exhibit enhanced strength, enhanced structural integrity, and reduced weight as compared to conventional fiber composite material structures. The metallic structures may, for example, increase the bearing strength of the HMC structures when the HMC structures are coupled (e.g., by way of a fixture assembly, such as a bolted fixture) to one or more other structures. In addition, the offset (e.g., staggered) lateral ends (e.g., at least the first lateral ends 108, 208, 308, 408, 508, 608, 708 shown in FIGS. 1-7) of at least some neighboring metallic structures of the HMC structures may disperse (e.g., distribute, scatter) stress concentration points in the HMC structures relative to conventional HMC structures including metallic structures exhibiting lateral ends that are all substantially aligned with one another. Accordingly, the configurations and positions of the metallic structures of the disclosure may facilitate enhanced properties (e.g., enhanced strength, enhanced structural integrity, and reduced weight) in the HMC structures of the disclosure as compared to conventional HMC structure configurations. In turn, multi-component structures (e.g., the multi-component structure 900 shown in FIG. 9), rocket motors (e.g., the rocket motor 1000 shown in FIG. 10), and rocket motor assemblies (e.g., the multi-stage rocket motor assembly 1100 shown in FIG. 11) including the HMC structures may exhibit improved performance, increased efficiency, increased reliability, reduced costs (e.g., material costs, equipment costs, etc.), reduced weight, increased simplicity, and/or increased safety as compared to many conventional multi-component structures, rocket motors, and multi-stage rocket motor assemblies not including the HMC structures.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of the disclosure.

What is claimed is:

1. A hybrid metal composite (HMC) structure, comprising stacked tiers comprising:
    first tiers comprising a fiber composite material, within each of the first tiers the fiber composite material comprising:
        a fiber platform comprising a single, wound tow comprising fibers substantially aligned with one another in a single direction; and
        matrix material surrounding the fiber platform; and
    second tiers directly adjacent to and longitudinally alternating with the first tiers, the second tiers comprising metallic structures and additional fiber composite material directly adjacent to first lateral sides and second, opposing lateral sides of the metallic structures, the first tiers substantially devoid of additional metallic structures, and the metallic structures physically separated from longitudinally neighboring metallic structures by the fiber composite material along an entirety of the metallic structures, the first lateral sides of each of the metallic structures laterally offset from corresponding first lateral sides of a longitudinally neighboring one of the metallic structures most longitudinally proximate thereto, and the second, opposing lateral sides of the metallic structures substantially laterally aligned with one another through a thickness of the HMC structure.

2. A hybrid metal composite (HMC) structure, comprising stacked tiers comprising:
    first tiers comprising a fiber composite material, within each of the first tiers the fiber composite material comprising:
        a fiber platform comprising a single, wound tow comprising fibers substantially aligned with one another in a single direction; and
        matrix material surrounding the fiber platform; and
    second tiers directly adjacent to and longitudinally alternating with one of the first tiers, the second tiers comprising metallic structures and the fiber composite material directly adjacent first lateral sides and second, opposing lateral sides of the metallic structures, the first tiers substantially free of the metallic structures, and the metallic structures physically separated from longitudinally neighboring metallic structures by the fiber composite material of the one of the first tiers along an entirety of the metallic structures, the first lateral sides of each of the metallic structures laterally offset from corresponding first lateral sides of a longitudinally neighboring one of the metallic structures most longitudinally proximate thereto, and the second, opposing lateral sides of at least some of the metallic structures are substantially the same distance from lateral ends of the first tiers.

3. The HMC structure of claim 2, further comprising:
    metal plates overlying and underlying the stacked tiers; and
    one or more fasteners longitudinally extending through each of the metal plates, the metallic structures, and the fiber composite material, the one or more fasteners comprising a material composition different than a material composition of the metallic structures.

4. The HMC structure of claim 3, wherein the second, opposing lateral sides of at least some of the metallic structures are substantially the same distance from one of the fasteners.

5. The HMC structure of claim 2, wherein the metallic structures constitute from about 25 percent to about 45 percent of a volume of the stacked tiers of the HMC structure and comprise one or more of titanium, a titanium-containing alloy, a nickel-containing alloy, and a stainless steel.

6. The HMC structure of claim 2, wherein the fiber composite material comprises carbon fibers individually having a diameter within a range of from about 5 μm to about 10 μm.

7. The HMC structure of claim 2, wherein the fiber composite material comprises ceramic fibers embedded in the matrix material, the ceramic fibers comprising one or more of alumina fibers, alumina-silica fibers, and alumina-boria-silica fibers.

8. The HMC structure of claim 7, wherein at least the matrix material of the fiber composite material exhibits a coefficient of thermal expansion within a range of from about $45 \times 10^{-6}$/K to about $65 \times 10^{-6}$/K at about 25° C.

9. The HMC structure of claim 2, wherein each of the metallic structures individually exhibits a thickness of about 0.01 inch, the first lateral sides and the second, opposing lateral sides of the metallic structures laterally offset by a distance of about 0.1 inch from the corresponding first lateral sides and corresponding second, opposing lateral sides of a longitudinally neighboring one of the metallic structures.

10. The HMC structure of claim 2, wherein each of the metallic structures exhibits substantially the same lateral width as each other of the metallic structures, the metallic structures individually comprising:
   a lateral center offset in a lateral direction from another lateral center of another of the metallic structures most longitudinally proximate thereto and substantially aligned with an additional lateral center of at least one other of the metallic structures; and
   lateral ends defined by the first lateral sides and the second, opposing lateral sides, the lateral ends offset in the lateral direction from corresponding additional lateral ends of the another of the metallic structures and substantially aligned in the lateral direction with corresponding further lateral ends of the at least one other of the metallic structures.

11. A method of forming a hybrid metal composite (HMC) structure comprising stacked tiers, the method comprising:
   forming an uncured fiber composite material comprising a single tow of fibers substantially aligned with one another in a single direction by infiltrating the single tow of the fibers with an uncured matrix material during at least one filament winding process;
   forming first tiers using the at least one filament winding process, the first tiers comprising portions of the uncured fiber composite material;
   forming second tiers using the at least one filament winding process, the second tiers directly adjacent to and longitudinally alternating with one of the first tiers, the second tiers comprising metallic structures and additional portions of the uncured fiber composite material directly adjacent first lateral sides and second, opposing lateral sides of the metallic structures, the first tiers substantially free of the metallic structures, and the metallic structures physically separated from longitudinally neighboring metallic structures by the fiber composite material of the one of the first tiers along an entirety of the metallic structures, the first lateral sides of each of the metallic structures laterally offset from corresponding first lateral sides of a longitudinally neighboring one of the metallic structures most longitudinally proximate thereto, and the second, opposing lateral sides of at least some of the metallic structures are substantially the same distance from lateral ends of the first tiers; and
   subjecting the first tiers and the second tiers to at least one curing process to form a fiber platform of the first tiers comprising a single, wound tow of the fibers and a matrix material surrounding the fiber platform.

12. The method of claim 11, further comprising:
   trimming portions of one or more of the metallic structures; and
   extending one or more fasteners longitudinally through each of the metallic structures and metal plates overlying and underlying the metallic structures.

13. The method of claim 11, further comprising selecting the uncured fiber composite material to comprise polymeric fibers comprising one or more of polyetherketone (PEK) fibers, polyetheretherketone (PEEK) fibers, polyaryletherketone (PAEK) fibers, polyetherketoneetherketoneketone (PEKEKK) fibers, and polyetherketoneketone (PEKK) fibers.

14. The method of claim 11, wherein forming the uncured fiber composite material comprises selecting the fibers to have a tensile moduli within a range of from about 275 GPa to about 350 GPa.

15. The method of claim 11, wherein subjecting the first tiers and the second tiers to the at least one curing process comprises exposing an uncured HMC structure comprising the first tiers and the second tiers to a temperature within a range of from about 200° C. to about 300° C.

16. The method of claim 11, further comprising selecting the uncured matrix material to comprise an epoxy material.

17. A rocket motor, comprising:
   a casing comprising:
   a first hybrid metal composite (HMC) structure;
   a second HMC structure directly laterally adjacent to the first HMC structure, each of the first HMC structure and the second HMC structure comprising alternating tiers of metallic structures and fiber composite material structures, the fiber composite material structures physically contacting and longitudinally alternating with the metallic structures without comprising additional metallic structures, and the metallic structures physically separated from longitudinally neighboring metallic structures by the fiber composite material structures along an entirety of the metallic structures, additional fiber composite material structures on a first lateral side and on a second lateral side of individual metallic structures, and each of the metallic structures exhibiting lateral surfaces laterally offset from corresponding lateral surfaces of the metallic structures most longitudinally proximate thereto on the first lateral side, and the metallic structures substantially laterally aligned with one another on the second lateral side; and
   at least one fastener assembly connecting the additional fiber composite material structures of the first HMC structure directly to the additional fiber composite material structures of the second HMC structure, the at least one fastener assembly comprising elongate structures individually extending through one of the first HMC structure and the second HMC structure as well as joining structures overlying and underlying the first HMC structure and the second HMC structure;
   a propellant structure within the casing; and
   a nozzle assembly connected to an aft end of the casing.

18. The rocket motor of claim 17, wherein the at least one fastener assembly comprises capping structures connected to opposing ends of each of the elongate structures.

19. The rocket motor of claim 17, wherein a thickness of individual metallic structures is substantially equal to a thickness of individual fiber composite material structures, the lateral surfaces of each of the metallic structures on the first lateral side laterally offset from the corresponding lateral surfaces of each other of the metallic structures most longitudinally proximate thereto by a distance equal to about ten times the thickness of one of the metallic structures.

20. The rocket motor of claim 17, wherein some of the lateral surfaces of the metallic structures of the second HMC structure are located proximate and spaced from an end of the second HMC structure by the additional fiber composite material structures, each of the some of the lateral surfaces laterally offset from the end of the second HMC structure by substantially the same distance.

21. The rocket motor of claim 17, wherein the metallic structures individually extend within one of the first HMC structure or the second HMC structure without laterally extending across an entirety of both the first HMC structure and the second HMC structure.

\* \* \* \* \*

UNITED STATES PATENT AND TRADEMARK OFFICE
CERTIFICATE OF CORRECTION

PATENT NO. : 11,719,193 B2
APPLICATION NO. : 17/330040
DATED : August 8, 2023
INVENTOR(S) : Benjamin W. C. Garcia et al.

It is certified that error appears in the above-identified patent and that said Letters Patent is hereby corrected as shown below:

In the Specification

| | | |
|---|---|---|
| Column 6, | Line 54, | change "structure 102*f*, a" to --structure 102*f*; a-- |
| Column 13, | Line 17, | change "tier 106*f*, and" to --tier 106*f*; and-- |
| Column 18, | Line 60, | change "706*f*, and the" to --706*f*; and the-- |
| Column 26, | Line 6, | change "(HNX)," to --(HMX),-- |
| Column 26, | Line 9, | change "$[5.5.0.0^{5,9}.0^{3,11}]$" to --$[5.5.0.0^{5,9}.0^{3,11}]$-- |

Signed and Sealed this
Fifth Day of March, 2024

Katherine Kelly Vidal
*Director of the United States Patent and Trademark Office*